United States Patent
Malasani

(10) Patent No.: US 10,219,202 B1
(45) Date of Patent: Feb. 26, 2019

(54) SYSTEM AND METHOD OF WIFI ROUTER BASED DETECTION AND CONTROL

(71) Applicant: Securifi Corporation, Grand Caymen (KY)

(72) Inventor: Rammohan Malasani, Taipei (TW)

(73) Assignee: SECURIFI CORPORATION, Grand Cayman (KY)

( * ) Notice: Subject to any disclaimer, the term of this patent is extended or adjusted under 35 U.S.C. 154(b) by 76 days.

(21) Appl. No.: 15/442,697

(22) Filed: Feb. 26, 2017

Related U.S. Application Data

(63) Continuation-in-part of application No. 15/263,878, filed on Sep. 13, 2016, now Pat. No. 9,584,335.

(60) Provisional application No. 62/449,103, filed on Jan. 22, 2017, provisional application No. 62/256,038, filed on Nov. 16, 2015.

(51) Int. Cl.
*H04W 84/12* (2009.01)
*H04W 48/16* (2009.01)

(52) U.S. Cl.
CPC ............ *H04W 48/16* (2013.01); *H04W 84/12* (2013.01)

(58) Field of Classification Search
CPC .............................. H04W 48/16; H04W 84/12
See application file for complete search history.

(56) References Cited

U.S. PATENT DOCUMENTS

| | | | | |
|---|---|---|---|---|
| 6,959,319 B1* | 10/2005 | Huang | ............. | G06F 17/30867 705/14.73 |
| 9,769,207 B2* | 9/2017 | Raleigh | ................... | H04L 63/20 |
| 9,866,677 B1* | 1/2018 | Maguire | ........... | H04M 1/72577 |
| 2009/0198563 A1* | 8/2009 | Tung | ...................... | G06Q 30/02 705/14.53 |
| 2011/0314145 A1* | 12/2011 | Raleigh | ............... | H04L 41/0893 709/224 |
| 2015/0257087 A1* | 9/2015 | Chung | .................. | H04W 48/16 370/338 |

* cited by examiner

*Primary Examiner* — Hashim S Bhatti
(74) *Attorney, Agent, or Firm* — Stephen E. Zweig

(57) ABSTRACT

A WiFi router based appliance control system and method. The router monitors the activity of various router connected devices, and compares this against various user selected criteria according to an overall combined activity scheme, where some activities may be rewarded and some penalized. Depending on the results, the router may in turn use various algorithms to control various router controlled devices, in a manner encouraged to encourage overall compliance with these schemes. Thus for example if the router may balance social media use versus exercise or energy use, and take steps (restricting web pages, altering thermostat settings) to encourage compliance with various user determined criteria. In some embodiments, the router may cooperate with external servers to extend the range of activities monitored and range of reward/penalty criteria.

24 Claims, 19 Drawing Sheets

Router Connected Device List

| | |
|---|---|
| 1. PC | - Active |
| 2. Father's phone | - Active |
| 3. Wife's phone | - Inactive |
| 4. Tablet | - Inactive |
| 5. Apple TV | - Active |
| 6. Video game | - Inactive |
| 7. Thermostat | - Active |
| 8. Door lock | - Active |
| 9. Fitness tracker | - Active |

Tablet activity on Mondays

| Time | Activity |
|---|---|
| 4:00-6:00 pm | YouTube, Facebook |
| 8:00-9:00 pm | Video game |
| 10 min | Facebook |
| 30 min | Youtube |
| 20 min | Snapchat |
| 40 min | Video game |

Figure 2

WiFi Clients

You can monitor new devices joining your WiFi network. You can also track when existing devices join and leave the network. You can control the rest of your HA devices (thermostat, lights) depending on when these devices join/leave the network. You can also arm/disarm your home based on this.

LEARN MORE →

PLEASE NOTE

By default the WiFi device time-out is set at 6 min. But in our lab we have seen some devices re-join after 30-40 min. To alleviate this potential issue we allow you to set your own, device specific time-out interval.

Figure 5

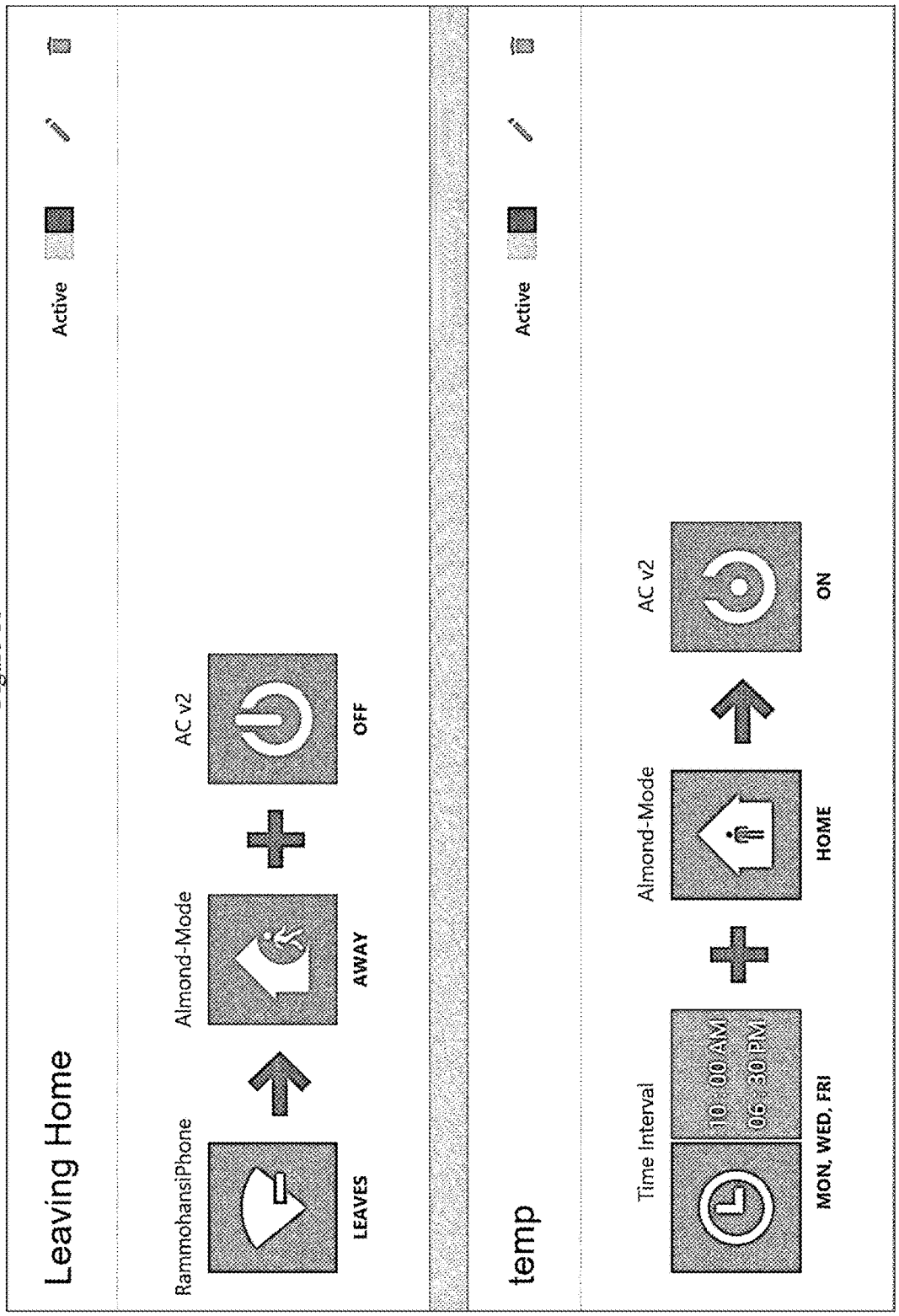

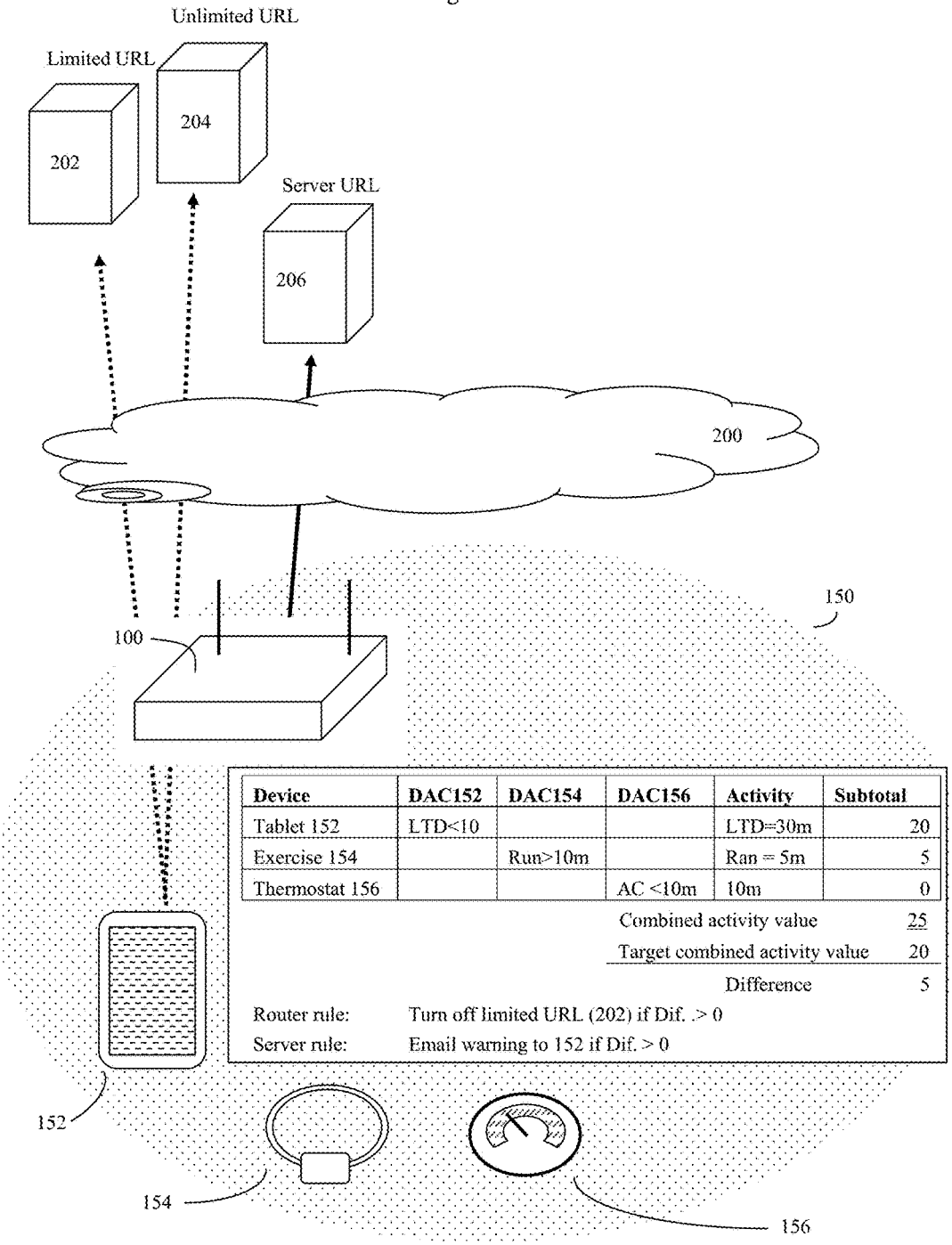

SYSTEM AND METHOD OF WIFI ROUTER BASED DETECTION AND CONTROL

CROSS REFERENCE TO RELATED APPLICATIONS

This application is a continuation in part of application Ser. No. 15/263,878, "SYSTEM AND METHOD OF WIFI ROUTER BASED PRESENCE DETECTION AND CONTROL", filed Sep. 13, 2016, inventor Rammohan Malasani, now U.S. Pat. No. 9,584,335, issued Feb. 28, 2017; Application Ser. No. 15/263,878 claimed the benefit of U.S. provisional application 62/256,038 "SYSTEM AND METHOD OF WIFI ROUTER BASED PRESENCE DETECTION AND CONTROL", filed Nov. 16, 2015, inventor Rammohan Malasani; this application also claims the priority benefit of U.S. provisional application 62/449,103, "SYSTEM AND METHOD OF WIFI ROUTERS WITH ENHANCED SMART HOME DEVICE SECURITY", inventor Rammohan Malasani, filed Jan. 22, 2017; the entire contents of all of these applications are incorporated herein by reference.

BACKGROUND OF THE INVENTION

Field of the Invention

This invention is in the field of home automation and wireless routers.

Description of the Related Art

WiFi Routers:

In recent years, local (e.g. home) wireless WiFi networks have become very popular, These WiFi networks, which typically operate according various IEEE 802.11 standards (e.g. 801.11b, 802.11g, 801.11n, 802.11ac and so on) typically consist of a factory pre-configured wireless WiFi router, which is often sold in a package consisting of the router, instructions, installation software, and other accessories such as a power supply and cable. This router is often in turn coupled to the internet via a modem (either built into the router, or separate to the router) and typically to a wireless, cable or optical fiber network connection to an internet service provider.

These router packages are intended to allow unskilled users to set up the WiFi system. Typically the instructions inform the unskilled user to first install the software on his or her local computer, connect the router (which may be a combination modem and router) to the local wired or wireless internet connection (often a wired DSL or cable connection, but alternatively may be a wired Ethernet connection, or even a fiber optic connection to the internet or other network of interest). The user will then interact with the program software to implement the various setup instructions.

Prior art on WiFi router configuration methods and devices include Liu, U.S. Pat. No. 7,496,754; Lin, U.S. Pat. No. 7,577,458; Mazur et. al., US patent application publication 2008/0172477; Lam et. al., US patent application 2009/0103547, and Patel et. al., U.S. Pat. No. 7,826,463.

As the popularity of WiFi routers has grown, various types of open source router software, such as DD-WRT, OpenWRT, and Tomato have also become popular, at least among the software enthusiast or "hacker" community. This open source software allows enthusiasts to control access to routers according to various customized rules, as well as implement more sophisticated functions such as policy based routing.

Some WiFi routers have been developed with integrated touch screens. These include the router described by Malasani in U.S. Pat. Nos. 8,555,047 and 8,812,827, the entire contents of both of which are incorporated herein by reference. This type of router design is presently marketed as the popular "Almond" and "Almond+" router. The Almond+ router, for example, in addition to WiFi transceivers, router circuitry (and functionality), and a touch screen interface, is also equipped with ZigBee™ and/or Z-Wave™ transceivers to allow this router to wirelessly interface with various types of ZigBee™ or Z-Wave™ equipped home automation devices.

Home Automation

Home automation as a concept has been around for many years, and indeed early concepts from Science Fiction literature date back more than a hundred years. However until recently, with the advent of low cost electronics, such concepts were seldom practical.

In recent years, however interest in home automation has greatly increased, and modern electronics now allows such devices to finally become both practical and cost effective. These home automation systems typically allow various electrical appliances in a building (which may or may not be a home residence) to be automatically controlled, usually with significantly more intelligence and efficiency than would result if the appliances were all independently controlled.

These remotely controllable appliances can, for example, include appliances such as heating and air conditioning, watering, lighting, pet feeding, entertainment devices, mobile robots, security systems, intercoms. Generally any electrically controlled or operated device can be potentially be used in a home automation system. Typically such home automation systems operate by using various environmental sensors to relay environmental status information to a home automation processor. This processor can then use this sensor data, and various algorithms previously stored in memory, to in turn control various electrical appliances.

For example, the previously discussed Almond+ WiFi router is currently marketed by Securifi Corporation. The Almond+, in addition to functioning as a WiFi internet access point and WiFi router, also can act, with the addition of suitable sensors, such as door open sensors, motion sensors, and the like act a smart home security and automation hub. Here the Almond+ can use information from these environmental sensors to, according to various preset algorithms, send control signals, such as ZigBee or Z-wave signals, to various appliances and other devices. When such appliances and other devices are controlled by specific, router based, algorithms and heuristics, these appliances and other devices will be called "router controlled devices".

Note that in some embodiments, the router may interact with the various appliances and other devices via intermediate internet servers (e.g. via the cloud). In these embodiments, these appliances and other devices may be called "router indirectly controlled devices". Although often, in the following discussion, the term "router controlled devices" may be understood to also include "router indirectly controlled devices", this distinction should be understood. In essence, a router indirectly controlled device is connected to the router by a cloud-based link.

BRIEF SUMMARY OF THE INVENTION

The invention is based, in part, on the insight that a WiFi router can be modified to act as a home automation hub without necessarily requiring the installation of any additional environmental sensors.

The invention is also based, in part, on the insight that typically the users of home automation systems carry portable or mobile wireless, WiFi equipped computerized devices, often smartphones, but also smart watches, tablet computers, collars, and the like on an almost continuous basis. Thus in many cases, the presence or absence of a particular user from a building, such as a home, can be reliably inferred from the presence or absence of a characteristic WiFi signal emitted by a device that the user typically carries. Indeed, since WiFi equipped devices worn by animals, such as wireless dog collars, are also conceivable, the users here, although often human, are not limited to humans, and indeed may be animals as well. Here when a particular computerized device (such as a WiFi equipped computerized device) is used to infer the presence of a human or animal user, this device is called a "user associated device".

The invention is also based, in part, on the insight that in many cases, the control of various electrical appliances in a building or area is also typically based on the presence or absence of certain human (or animal) users who habitually visit or inhabit that particular building or area.

Although throughout this disclosure, buildings, such as residences, office buildings, retail buildings, factories, and the like are often used as specific examples; in fact the invention disclosed herein need not be limited to buildings. WiFi typically extends outside of buildings as well, and thus use in yards, gardens, farms, parks, stadiums, and other outdoor locations is also contemplated.

For example, when a person with a propensity for cool temperatures, well lighted rooms, and background music enters a dwelling, then it would be useful to have the various dwelling appliances adjust accordingly. But, on the other hand, if that person's spouse is also in the dwelling, and has an opposite set of preferences, then ideally a home automation system can, if detecting WiFi equipped computerized devices (user associated devices) associated with the spouse as well, make use of various router based pre-stored rules, algorithms, heuristics or rubrics to adjust the appliances accordingly. Thus in this two person example, different appliances in a home may each have at least three different default settings depending if one, or the other, or both is present.

Additionally, other factors, such as time of day, day of week, etc., as well as optional input from sensors may also be used to add further sophistication to the system.

Thus in some embodiments, the invention may be any of a system or a method of using a WiFi router to detect and control various types of router controlled devices. This WiFi router will typically comprise a processor, memory (which may be any of local router memory, or remote cloud memory such as remote database server memory), and at least one WiFi transceiver. The method operates by using the WiFi router to detect a presence of at least one user associated device (typically a WiFi equipped mobile device often carried by a specific user) by determining a WiFi signal characteristic of that user associated device. The system and/or method then operates by using this WiFi router processor, as well as various types of user associated device identification criteria that are stored in the router's memory, to identify (determine a probable identity) of that at least one user associated device.

Once this identity has been established, the router processor can then use various router controlled device operational heuristics (often various logical "if-then" or "if-then-else" type rules, or alternatives such as "switch statements" previously stored in the router's memory), and the likely identity of the one or more user associated devices, to control the operation of at least one router controlled device. This at least one router controlled device will often be a home automation appliance, or other automated appliance, which may be connected to the router by a wireless link, such as a ZigBee or Z-Wave link, router switched power connector, or any other type of wired or wireless link as well.

Routers can also monitor the activity of various router connected devices by, for example, using the activity characteristic WiFi signals transmitted by these various devices. These activity characteristic WiFi signals may also be used for another range of applications.

As an example, users may often have sub-optimal habits. They may spend too much time browsing time wasting websites (e.g. many social media websites, such as Facebook, are time wasters), not exercise enough, or be spending too much energy on heating and air conditioning.

A related aspect of the invention is based, in part, on the insight that the invention may also be used to help users optimize some of these habits. Users may, for example, wish to reward themselves for exercising more by allowing themselves more time to browse on social media, or punish themselves for too much time on social media by lowering their energy costs by reducing air conditioning or heating. Thus in an alternate embodiment of the invention, the router can be configured to achieve such more complex habit optimization objectives.

According to this aspect of the invention, the users can configure the router to use activity characteristic WiFi signals generated by the various devices to determine various activities such as patterns of web browsing, exercise, energy use, and the like. The user can also configure the router with various device activity criteria to monitor these various devices. These device activity criteria can be based on the user's objectives (e.g. maximum amount of time browsing certain websites, minimum amount of time exercising, energy use, and the like). The user can then configure the router with various penalty or credit points depending on the consequences of meeting or failing these various objectives. These various penalty or credit points can then be summed up to produce a combined activity value. This combined activity value can then be compared to a target combined activity value (also typically user controlled). The results can then, for example, be used to trigger various router controlled device operational heuristics.

The net result is that the user can set up a self-imposed system of rewards and penalties that help the user achieve certain objectives. For example, if the user spends too much time on Facebook and doesn't exercise enough, the next day, the router controlled device operational heuristics might shut off access to Facebook, or alternatively turn down the air conditioning, depending on how the user has set up the system. As will be discussed, in some embodiments, the router may also be configured to cooperate with a remote server to increase the range of potential penalty or reward points, as well as self-imposed rewards and penalties.

BRIEF DESCRIPTION OF THE DRAWINGS

FIG. 2 shows a one page brochure describing how the invention can monitor new devices joining the WiFi network (e.g. user associated devices), and use the presence of these devices to in turn control various HA (home automation) devices (e.g. router controlled devices).

FIG. 5 shows an extended list of the various other WiFi devices (user associated devices) that the router has either presently detected (active), or has previously detected (inactive) but now cannot because these inactive devices are either out of range, turned off, or at least have their WiFi transceivers turned off.

FIG. 16 shows a summary of two different algorithms operating in the Almond+ router.

FIG. 17 shows an example of how the invention can regulate one or more WiFi connected devices according to an overall optimization scheme, such as a scheme designed to achieve a user selected goal.

DETAILED DESCRIPTION OF THE INVENTION

Figure 1A:
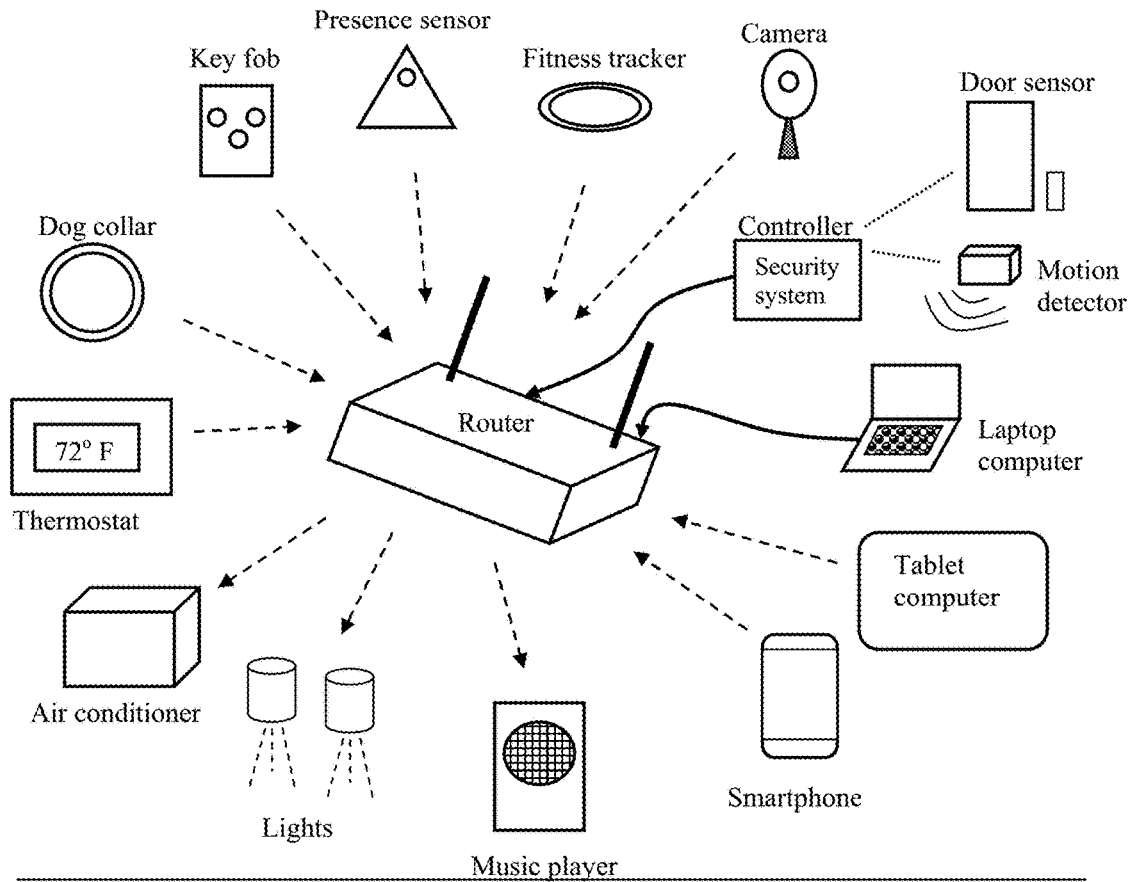
FIG. 1A shows an overview of the concept. Here a router, such as a WiFi router, can be used to detect the presence of a large number of different user associated devices (often WiFi equipped mobile wireless devices), and infer the presence of users that typically use these different devices.

FIG. 1A shows an overview of the concept. Here a router, such as a WiFi router, can be used to detect the presence of a large number of different mobile wireless devices (user associated devices) and/or the state of various other sensors as well. These mobile wireless devices that are effective as user associated devices can include wireless dog collars, key fobs, presence sensors, fitness trackers, laptops, tablet computers, mobile phones mobile phones and other type of user presence sensors.

In a preferred embodiment, these user presence sensors generate wireless WiFi signals that the WiFi router can detect directly, although other methods, such as direct wired connections (shown for a connection between the Laptop computer and the router) can also be used.

Here, since the router is typically also acting as an access point between any given WiFi equipped computerized device and the internet, the router also knows which WiFi devices are exchanging data with which internet servers, at least on a URL (uniform resource locator) or URI (uniform resource identifier) basis. As will be discussed, this router feature can allow even non-mobile WiFi equipped devices, such as desktop computers, to also function as user associated devices.

FIG. 1A also shows that the router can use various heuristics, to be discussed, to control the operation of various router controlled devices. These can include devices such as heating and air conditioning equipment, lights, music players, and many other types of devices as well. As will be discussed, these heuristics can be based on various "if then" or "if then else" rules, as well as various other rules such as day and time related rules.

In some embodiments, depending on which WiFi devices successfully establish a bidirectional wireless link with the router, the router processor can then create a "list" in its memory as to which WiFi devices are present (or at least turned on) or not. Here WiFi devices that the router has seen before, but are not seeing presently, can be listed as inactive.

In some embodiments, the router may be a WiFi router with an integrated touch screen, such as the router described by Malasani in U.S. Pat. Nos. 8,555,047 and 8,812,827, the entire contents of both of which are incorporated herein by reference. Note however, that use of an integrated touch screen is optional, and other methods, such as various types of router served interface (e.g. web pages, sending and receiving data to a mobile app, audio interface to devices such as Apple Siri, Google Now, Amazon Echo, etc.), may also be used to configure the router according to the teachings described herein.

Figure 1B:
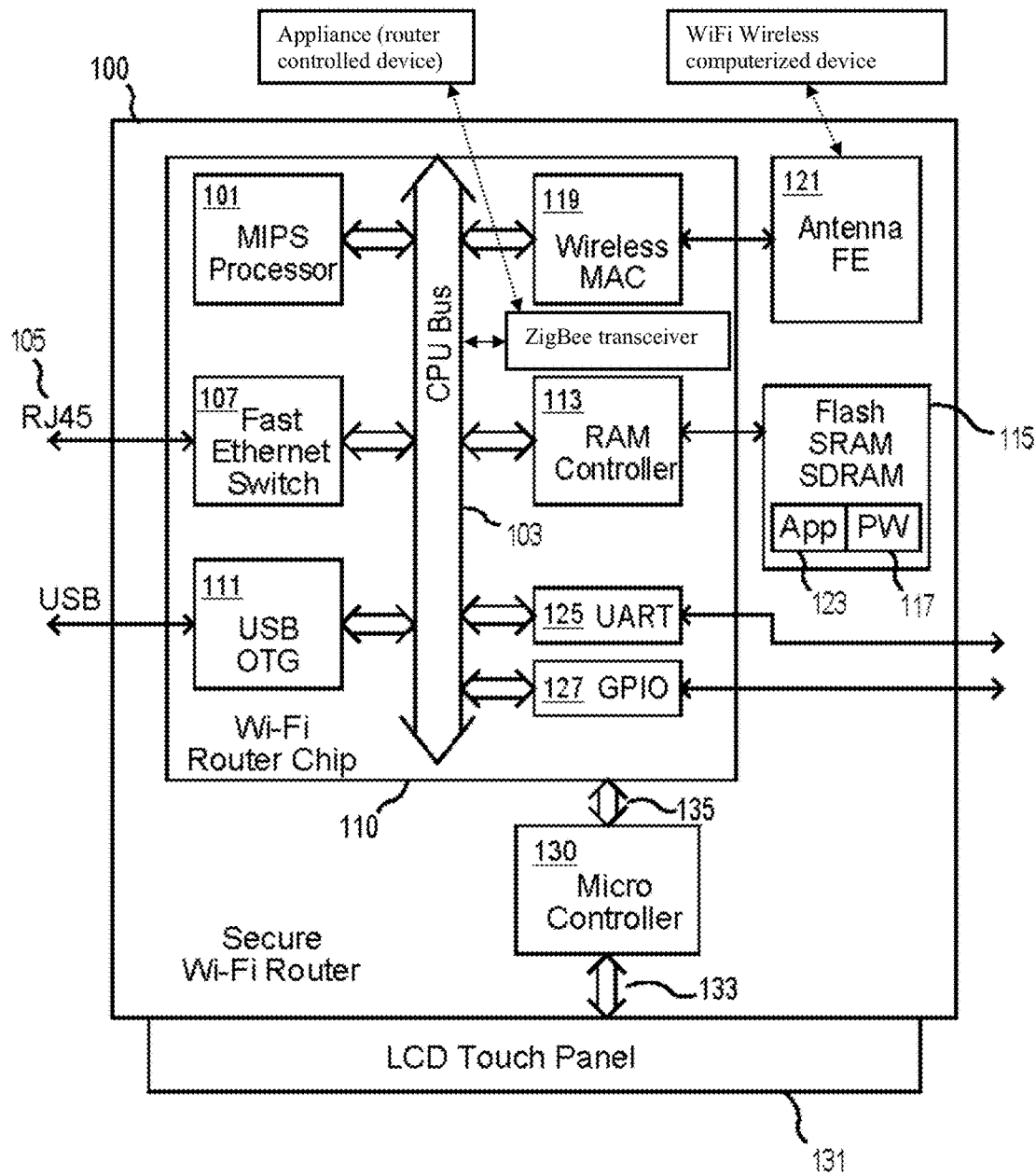
FIG. 1B shows an example of a router, such as the Almond+ router, using its WiFi transceiver (119, 121) to detect the presence of a local WiFi equipped user associated device, infer the presence of users, and control equipment based on various algorithms stored in the router's memory.

FIG. 1B shows an example of a router, such as the Almond+ router, using its WiFi transceiver (119, 121) to detect the presence of local WiFi equipped user associated devices. In this example, the router also has another connectivity device (here a wireless ZigBee transceiver) that can control nearby appliances (router controlled devices). The other components of the WiFi router are as described in applicant's previous U.S. Pat. Nos. 8,555,047 and 8,812,827, the entire contents of both of which are incorporated herein by reference.

In some embodiments, the router (100) may have a built-in, touch sensitive, display screen (131). The router may be fabricated using a commercially available Wi-Fi router system-on-a-chip (SoC) device (110), such as the RT3052 AP/router SOC available from Ralink Technology Corp., Cupertino, Calif. or other type device, such as a combination of the AR7240 Processor and the AR9285 MAC/Baseband/Radio (both available from Atheros Communications, San Jose, Calif.) or other Wi-Fi electronics.

The Wi-Fi router (100) may include a processor such as a MIPS processor (101) (or other processor design). In an exemplary embodiment, the MIPS processor (101) may have a clock rate of about 384 MHz, and may function to provide control to the router (100) via a 128 MHz CPU bus (103). Other processor types, clock rates, and processor or communication methods and buses may also be used.

The Wi-Fi router (100) may provide conventional wired output to an RJ45 port (105) via a fast Ethernet switch (107) on the CPU bus (103), and to an optional USB port (not shown), via a universal serial bus on the go (USB OTG) module (111) or other device. Operation of the Ethernet switch (107) and the USB OTG module (111) may be controlled by the processor (101) via the CPU bus (103). This router may use a wireless LAN network media access controller (MAC) device to provide packet transmission to the user via an RF front end and antenna module. This router may also support a universal asynchronous receiver/transmitter (UART) interface to enable serial communication with a serial console port.

In some embodiments, the MIPS processor, the UART module, the USB module, MAC, and fast Ethernet Switch, part of the Front End and the RAM controller may be provided on a single router chip, and such router chips may be used to provide at least a component of the present invention as well.

The Wi-Fi router (100) may also include a RAM controller (113) for providing access to a memory module (115). In an exemplary embodiment, the memory module (115) may comprise a flash memory, a static random access memory (SRAM), or a synchronous dynamic random access memory (SDRAM).

In some embodiments, router's memory module (115) may include a default (factory preset) password designed to be difficult for an attacker to anticipate, such as factory preset login password (117) which can stored in the memory of memory module (115) during a manufacturing step in the fabrication of the Wi-Fi router (100). As previously discussed, in some embodiments, the invention's router may additionally contain a touch-sensitive display screen (131), capable of directly showing the router's settings and other easy to use configuration options (e.g. various if-then type control heuristics), that can be directly accessed by the user without the use of any additional outside computer or software.

In this disclosure, the various examples were implemented by uploading a previously unreleased version of software to a Securifi Almond+ router. Thus please note that although the Almond+ router itself predates the filing date of this disclosure, the software used to implement the functionality described herein has not been released to the public or otherwise published prior to the filing date of this disclosure.

Thus as previously discussed, in some embodiments, the invention may be a system or method of using a WiFi router to detect and control router controlled devices. As shown in FIG. 1B, this WiFi router will typically comprise at least one processor, memory, and at least one WiFi transceiver. Expressing the invention in methods format, the method may comprise using the WiFi router (usually by using the router's processor and associated software stored in memory) to detect a presence of at least one user associated device (often, but not always, a mobile WiFi equipped user associated device) by determining (e.g. by detecting and then using the processor to recognize) a WiFi signal characteristic of this at least one user associated device. Examples of the range of options of this user associated device are shown in FIG. 1A.

Thus according to the invention, the router will use its processor and user associated device identification criteria (typically stored in the router's memory) to determine the probable identity of the at least one user associated device, or at least the presence of a user. Typically this identity may be relatively specific to an individual type of device being detected. Here the idea is to allow the router's processor to determine if the router has likely WiFi detected the presence of this particular user associated device before.

According to the invention, the router will then use its processor, and various types of router controlled device operational heuristics stored in the router's memory (e.g. algorithms by which to operate various types of appliances, such as home automation appliances), as well as the probable identity of at least one user associated device, to control an operation of at least one router controlled device (e.g. home automation appliance).

Note that alternative nomenclature is possible. More generally, the user associated device may be viewed as being the "device used to infer the presence of a user", and the device that is acted upon by the router based upon the inferred presence of a user may be viewed as being the "router controlled device" or the "appliance".

Put alternatively, the invention may also be a wireless router that can detect (or at least infer) the presence of various human or animal users on its network based detecting WiFi patterns of use and various detection heuristics (algorithms). The wireless router then uses this presence information, along with other algorithms to then control at least some router connected appliances (router controlled devices).

In Terms of User Presence Detection:
  Wireless computerized devices can be identified based on their MAC address or other types of unique identifiers (here MAC address is the Media Access Control Address of the device)
  Wireless computerized devices (or at least the presence of the user that uses the device) can also be identified based on websites visited at certain times of the day
  One or more user associated devices can be assigned to the same user.
  In a preferred embodiment, the at least one user associated device will have a time-persistent MAC address; and the WiFi router will store this persistent MAC address in the router's memory (along with optional operator entered information informing the router that this particular MAC address is useful for user presence detection purposes). In this case, the router's computerized device identification criteria can use this persistent MAC address to determine the probable identities of the various user associated devices, and more importantly, infer that certain users are present local to the router. (Here remember that WiFi signals typically operate over a 300 foot or less radius, and if a WiFi signal from a user associated device is detected, then the router can infer that the user is likely within 300 feet of the router.)

Types of User Associated Devices (Device Used to Infer the Presence of a User):
  It should be apparent that the router methods described herein need not be limited to WiFi equipped user associated devices. Indeed, the presence of various users can be detected using a broad variety of user associated devices, which can connect to the router using a large variety of different interfaces, including wired interfaces (Ethernet, USB, etc.) or alternative wireless protocols such as ZigBee, Z-wave, Bluetooth and the like. However in a preferred embodiment, the devices used to infer the presence of a user are often WiFi equipped mobile user associated devices that are using the router as a gateway to a larger computer network such as the internet.

Typically the user associated device (device used to infer the presence of a user) is initially associated with a user (typically a human user, although users can be animals as well) by storing an association between the user associated device and the user in the router's memory. This can be done by an operator using the router's operator interface as described elsewhere in this disclosure, or by alternative methods. The router will further use software based algorithms to then infer the presence of the user, and often then further use this inferred user presence, along with previously stored heuristics or algorithms, to then control an operation of said at least one router controlled device (router controlled device, appliance).

The association between particular user associated devices and particular users, which is ultimately stored in the router's memory) can be done by various methods One or more user associated devices can be manually assigned to a user by, for example, using the router's operator interface to manually enter this association.

One or more user associated devices can be heuristically (e.g. following various rules that themselves can be entered in by an operator into the router's memory) determined to belong to a given user The association between various user associated devices and at least certain classes of users can be done by entering in algorithms into the router that correlate times of day or days of week when user associated devices join and leave the network.

Again using an office building as an example, if large numbers of the roughly the same set of user associated devices normally join the network on a 9:00 AM to 5:00 PM basis on Mondays to Fridays, then the router can be instructed to assume that these user associated devices are indicative of the presence of employee users. The office building's heating and air conditioning system and lighting system can be programmed at the router to respond appropriately. Note that here, the router is acting as a control center, and the router is controlling the various heating and air conditioning equipment (for example) as router controlled devices.

This way, if some employees show up unexpectedly on the weekend or after normal working hours, the router can detect this (e.g. it sees a lot of WiFi equipped mobile phones showing up), and (with proper router based algorithms) keep the office's lights on or heating/air conditioning running outside of normal working hours.

Although in some embodiments, such as the Almond router discussed earlier, the router controlled device can establish a communications link (e.g. be connected) to a router by a wireless ZigBee communications link, other methods may also be used to connect the router controlled device to the router. For example, other types of links may be established with the aid an intermediate relay device, by a direct electrical wire link, by any type of wireless link, by optical or infrared links, or by sonic (e.g. sound waves) links.

As previously discussed, in a preferred embodiment, the invention's system and method will be one in which the at least one user associated device is a mobile wireless (WiFi) computerized device associated with a user. Often WiFi equipped smartphones can be used for this purpose. Here the router is a wireless WiFi router (and often internet access point) that uses the WiFi based detection of the WiFi presence of the mobile user associated device to further determine (or infer) the presence of a given user, and to use the (inferred) presence of a given user (or users) to control the operation of at least one router controlled device (appliance).

Although, as previously discussed, identification of a given user associated device (user associated device) by using the device's MAC address is often the easiest way to identify a device, this option may not always be available. Thus alternative methods of identifying devices, or at least making inferences between a given device and the presence of a particular user, can be useful.

Thus in some embodiments, alternative methods, such as patterns of usage, may be used to identify either particular user associated devices or at least the users associated with a given user associated device. In these embodiments, typically the user operates their user associated device according to various user specific patterns. This in turn can produce user pattern characteristic WiFi signals that are detectable by the WiFi router.

According to this embodiment, algorithms to deal with these various user patterns characteristic WiFi signals are typically stored in advance in the router's memory. Thus when the WiFi router detects these user pattern characteristic WiFi signals, the router's processor can determine that there is a match between the router detected user pattern characteristic WiFi signals, and the user pattern characteristic WiFi signals that were previously stored in the router's memory. This in turn lets the router processor determine or infer if that user is present, and often to also determine (or infer) the probable identity of the user associated device used by the user.

This embodiment of the method is particularly useful when the WiFi router has a network connection with the Internet (e.g. is being used as an internet access point), and when the detected user pattern is a pattern of accessing the internet in which, for example, the user pattern consists of at least one URL of at least one internet server that is being accessed by the user's mobile user associated device. For example, if a given user typically browses an unusual URL, then this allows the router to infer that this user may be present. The browser in turn can make decisions such as, "If user is accessing the URL http://www.slashdot.com, assume husband user is home, and send a command to the air conditioner to turn on."

Other methods of associating patterns of use, such as determining that some users typically use their WiFi computerized devices at certain times of the day may also be appropriate. For example, if one person is in the habit of waking up in the middle of the night and browsing the internet before going to the kitchen to make a snack, the router may be programmed (by the operator) to determine that 2:00 AM web browsing is typically then associated with a user who wants the kitchen light to be turned on. The operator can then program the router to send a signal to the kitchen light to turn on in this case, and it is the kitchen light that is the router controlled device.

So in some embodiments, the detected user pattern or algorithm can further comprise criteria concerning at least one time of day that the user accesses said at least one remote (often internet connected) server.

As may be seen, an important aspect of the invention is thus to provide ways to allow the router to be programmed with appropriate algorithms/heuristics to implement this type of router control functionality. Typically then, according to the invention, the system and method will often further use the router to provide an operator interface wherein an operator (usually a human operator) may configure various user associated device identification criteria and the router controlled device operational heuristics.

This operator interface can be produced by various methods and devices. In some embodiments, the WiFi router can use its processor to provide this operator interface by generating web pages to a router connected computerized device used by the user (often the user device will be running a web browser). Alternatively the router can provide information to an app running on a user device such as a smartphone or tablet.

A web browser based operator interface is shown in more detail in FIGS. 2 to 16. As will be discussed, this operator interface can thus provide an ability for the operator of the router to configure the various router controlled device operational algorithms/heuristics by entering various types of "if—then" rules. The router can then store these various types of "if—then" rules in the router's memory. Alternatively, as previously discussed, for those routers that are equipped with a touch screen, this type of operator interface might be generated directly on a router touch screen.

Some examples of heuristics (algorithms) used by the invention can include:
   A user associated device being inactive for a certain period of time. Inactivity is defined by a lack of any communications (e.g. wireless WiFi communications) with the router.
   A user associated device (typically previously recognized by the router) rejoining the network after a certain period of inactivity
   A user associated device that communicates with "certain" websites at certain times of the day or weekend for a "certain" duration. This can be useful when the user associated device has a non-unique MAC address. Here, even though the computerized wireless device itself cannot be unambiguously determined, the habits of the human (or animal) that typically uses the device can often be used to at least determine if that device user is likely to be present.
   A group of devices that join and leave the network during similar times of the day or week—here for example, in an office or factory setting, a large number of different user associated devices joining to the network can be used as an indication that the office is now open to employees or customers, and the router may use this information to, for example, set environmental and lighting router controlled devices (appliances) accordingly.

Actions that can be performed using inferences regarding the presence of certain users, which are inferred by detecting WiFi signals from WiFi computerized devices that the users are using, include:
   Use inferred user presence to set modes (home, away, vacation, night at home) of security systems, thermostats, shades, lights and other home automation systems.
   The security system could be controlled by the router itself, or the security system can be a different device on the network connected to the router.
   The home automation controller could be the router itself or a different device.
   The system can allow different users to set unique and personalized settings for their lighting, home security, and thermostats at home.
   The system can allow groups of users to set personalized settings for their home automation or home security that are different from individual user settings.
   The system can also reduce or increase the bandwidth allocated to certain devices depending on the presence of certain users. For example, in "away" mode, the camera could get a higher bandwidth priority than "Apple TV", but in home mode, the just the opposite. QOS—quality of service can be varied depending on which user is present status (as a humorous example: if the husband is home set QOS high: if only the unwanted visiting in-laws are home, set QOS low)

Alternatives to the "if—then" type heuristics may also be used. Some of these alternatives include various types of switch statements (also called "switch, "case", "select" or "inspect" in various computer languages). Switch statement like heuristics allow a user easily specify multiple outcomes depending on the value of a given input parameter. Here, for simplicity and robustness, use of structured switch statements may often be preferred. User entered lookup tables and control tables may also be used, however such methods are generally less preferred as these later methods are often harder for unskilled users to learn.

EXAMPLES

FIG. 2 shows an overview describing how the invention can monitor new devices joining the WiFi network, and use detection of these devices, and the inferred presence of certain users, to in turn control various HA (home automation) devices. In some embodiments, the router may take a few minutes to determine if a particular WiFi device is present or not, and thus it may be useful to set a device time-out timer so that the router does not react too quickly to momentary loss of signal from the various WiFi devices.

Figure 3:
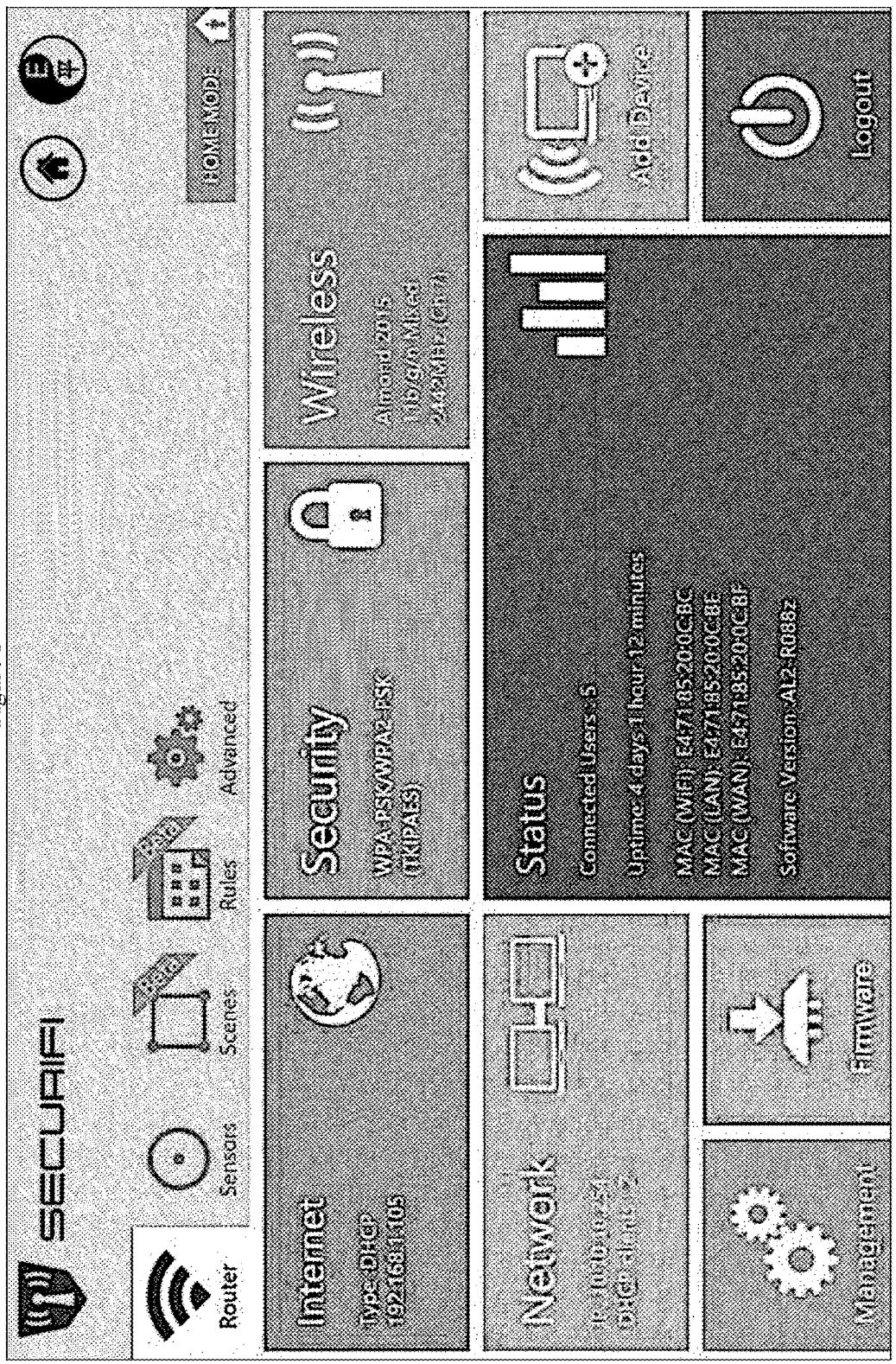
FIG. 3 shows an example of how the heuristics of the router may be set by an operator and then stored in the router's memory.

FIG. 3 shows an example of how the heuristics (algorithms) of the router may be set by an operator and then stored in the router's memory. Here the router is producing a main router control webpage. In an alternative embodiment, if the router is equipped with a touchscreen, the router this same interface may be displayed on the router touchscreen.

Figure 4:
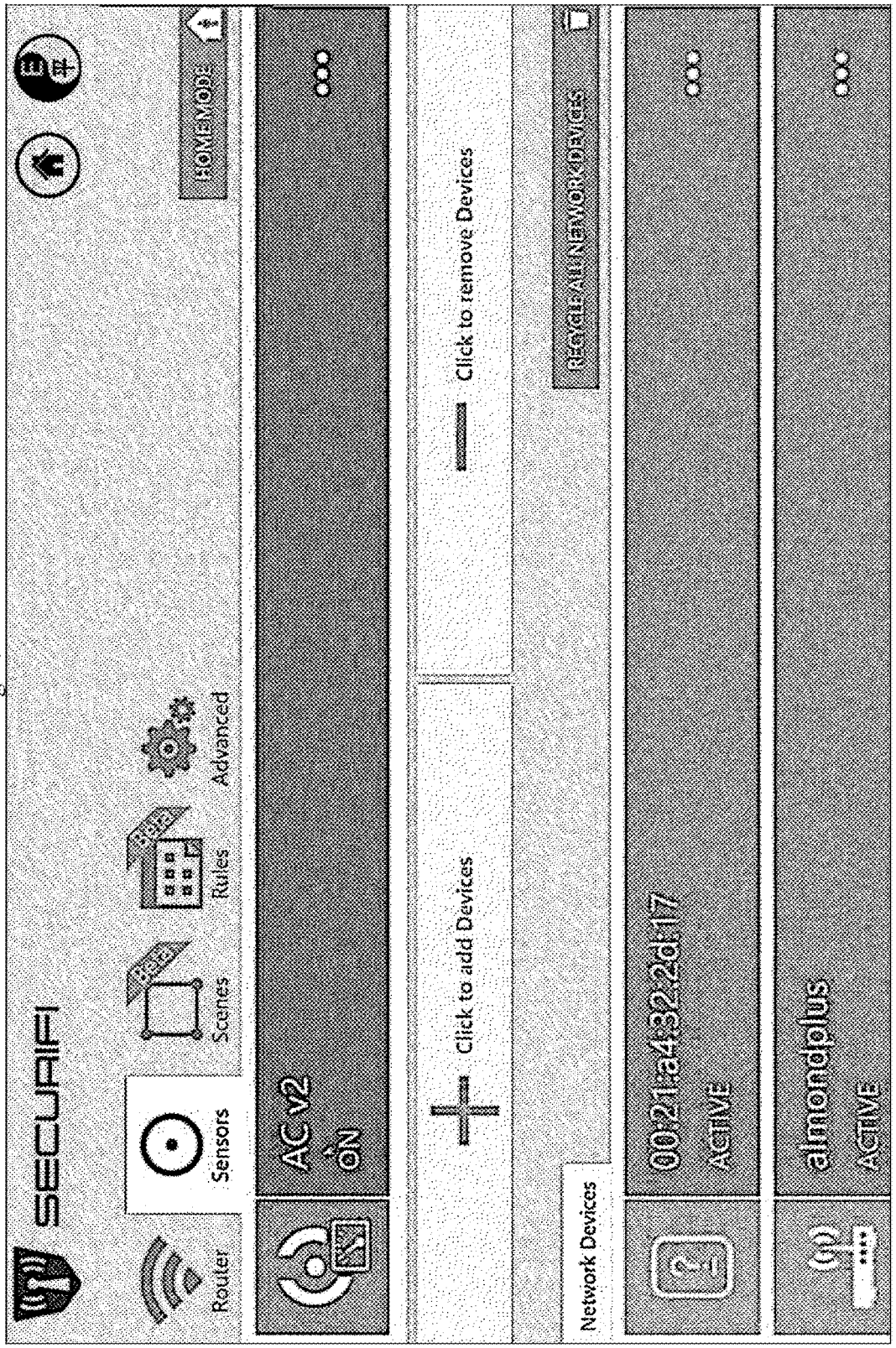
FIG. 4 shows an example of how, under the "sensors" section of the router control page, an air conditioning device (which also acts as a sensor as well) that connected to the router (here using a wireless ZigBee connection) may be found. This air conditioning device is an example of a router controlled device.

FIG. 4 shows an example of how, under the "sensors" section of the router control page, an air conditioning device (which also acts as a sensor as well) is connected to the router (here using a wireless ZigBee connection) may be found. This air conditioner is a router controlled device. Additionally, the lower portion of the page shows that the router (here an Almond+ device) has detected various WiFi network devices, including itself. Some of these various WiFi network devices can usefully function as user associated devices.

Figure 5:
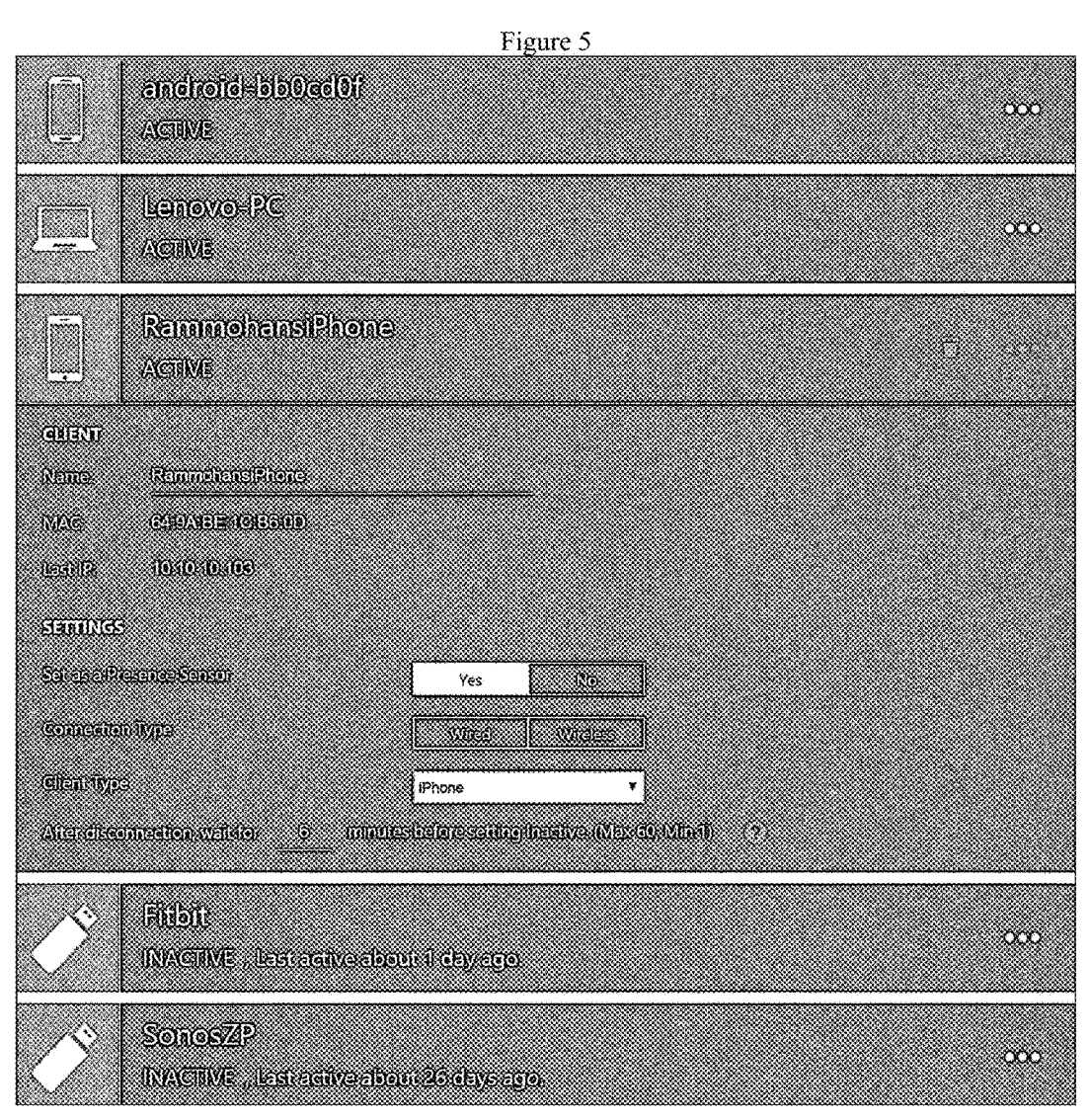

FIG. 5 shows an extended list of the various other WiFi devices that the router has either presently detected (active), or has previously detected (inactive) but now cannot detect because these inactive devices are either out of range, turned off, or at least have their WiFi transceivers turned off. Note that the iPhone device has been given a user adjustable 6 minute grace period, or timeout, before the router processor and software will declare the iPhone inactive.

Note that not all WiFi devices are useful to detect user presence. For example, WiFi devices that are always on and associated with a dwelling may not be useful as user presence devices. However smartphones typically function well as user associated devices because everyone usually has their smartphone with them.

Figure 6:
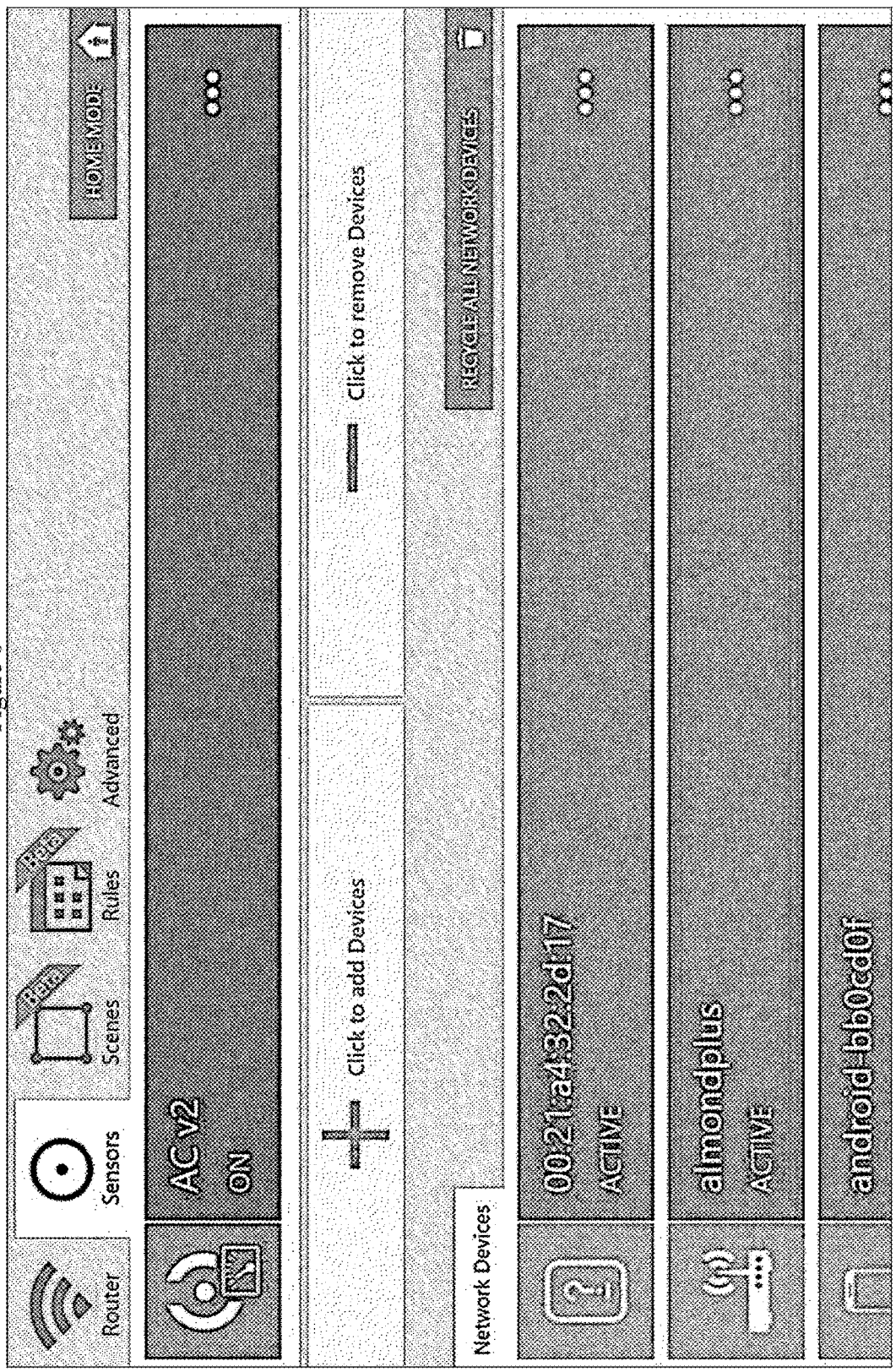
FIG. 6 shows the operator interface control panel by which a human operator can add or subtract devices (either user presence devices or router controlled devices) from the router's software configuration.

FIG. 6 shows the operator interface control panel by which a human user can add or subtract various devices from the router's software configuration.

Figure 7:
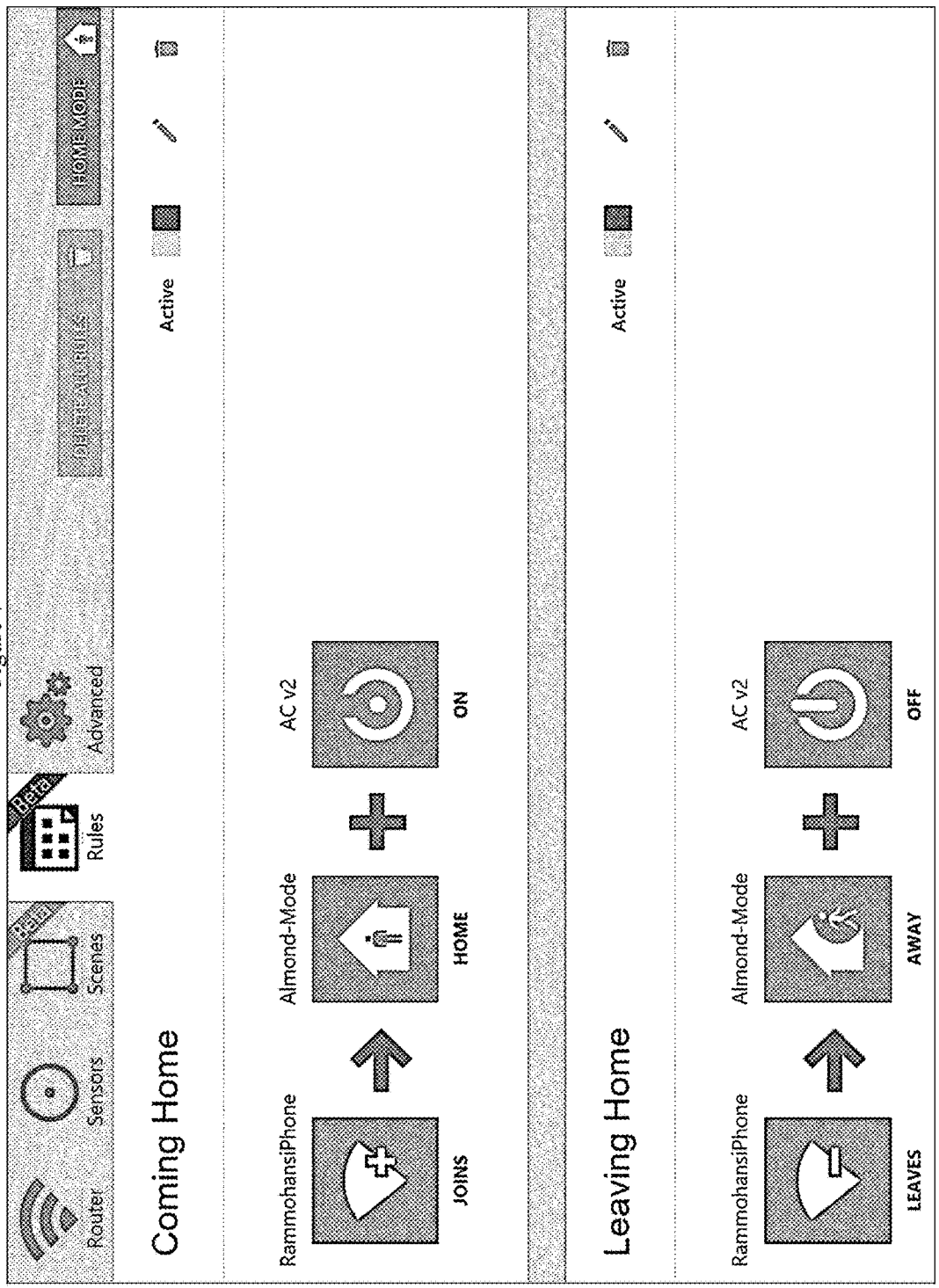
FIG. 7 shows how the user can configure the heuristics (algorithms, control rules) that determine how the router will control various router controlled devices in response to detecting the presence of various user associated devices, and in response to other criteria as well.

FIG. 7 shows how the user can configure the heuristics (algorithms, control rules) that determine how the router will control various router controlled devices in response to detecting the presence of various user associated devices, and in response to other criteria as well.

Here the Almond+ router is assumed, for each user associated device, to exist in a "home" state when that particular user associated device (and the human or animal user associated with that particular user associated device) has been detected by the router. That is, Almond+ infers that this user is "home".

The Almond plus router can also exist in an "away" state where that particular user associated device (and the human or animal user associated with that particular user associated device) cannot be detected, and thus router assumes that this user is absent (away).

Here the operator has previously configured the router so that when the router first initially detects a particular user's iPhone (here Rammohan's iPhone) after it has been absent (not detected), the rule is that the router will both configure itself into a "user at home" mode, and also turn on the air conditioner.

The router has also been programmed with the reverse rule, which is that if a particular user's iPhone (here again Rammohan's iPhone) presence can no longer be detected (after a suitable guard time interval), than that user will be assumed to be absent. The router will configure itself into an away mode, and will also turn the air conditioner off.

As previously discussed, often the identity of a given WiFi device can be consistently determined by that particular device's WiFi MAC (media access control) address, and the association between that MAC address and a particular user can be also set using the router's control screen (not shown).

Figure 8:
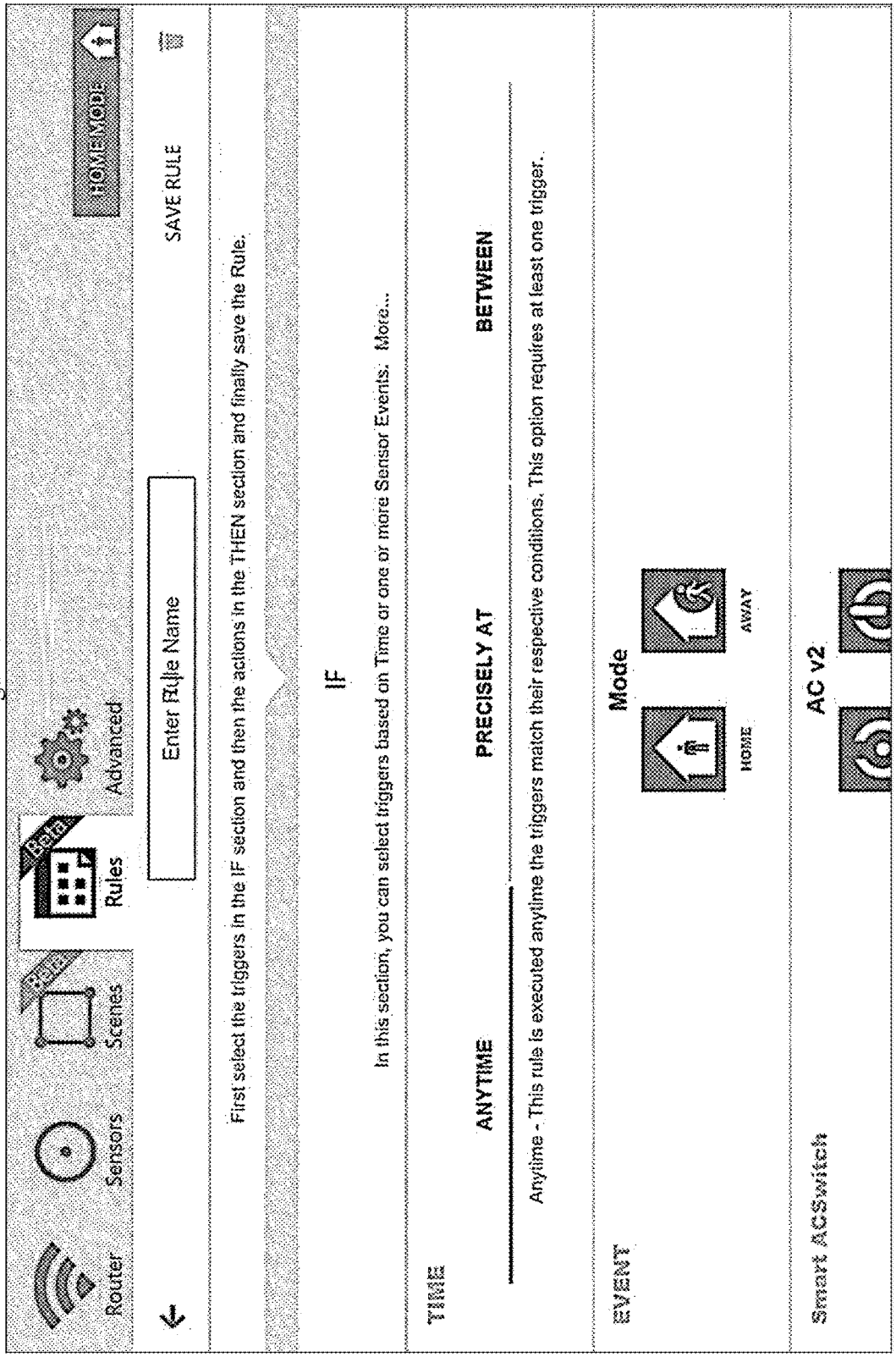
FIG. 8, shows the process by which a new rule, algorithm, or heuristic can be entered into the router's memory using the router's operator interface (such as a web page, or though the router's built in touch screen if any).

FIG. 8, shows the process by which a new rule, algorithm, or heuristic can be entered into the router's memory by using the router's operator interface (such as a web page, or though the router's built in touch screen if any). Here the operator is prompted to enter a name for the rule ("temp" is used here), and the rules are typically structured as "IF condition X then "result Y" type "if-then" rules. Note that the rules here also have a time component. That is, the rule can be set to be implemented anytime, or at a precise time, or between certain times. There also can be compound rules with multiple "if-then" sections.

Figure 9:
FIG. 9 shows the operator starting to configure the new "temp" rule.

FIG. 9 shows the operator starting to configure the new "temp" rule. Here the operator wishes to only run the target air conditioning device between certain hours of the day, here starting at 10:00 AM, and in this example, only during certain days of the week.

Figure 10:
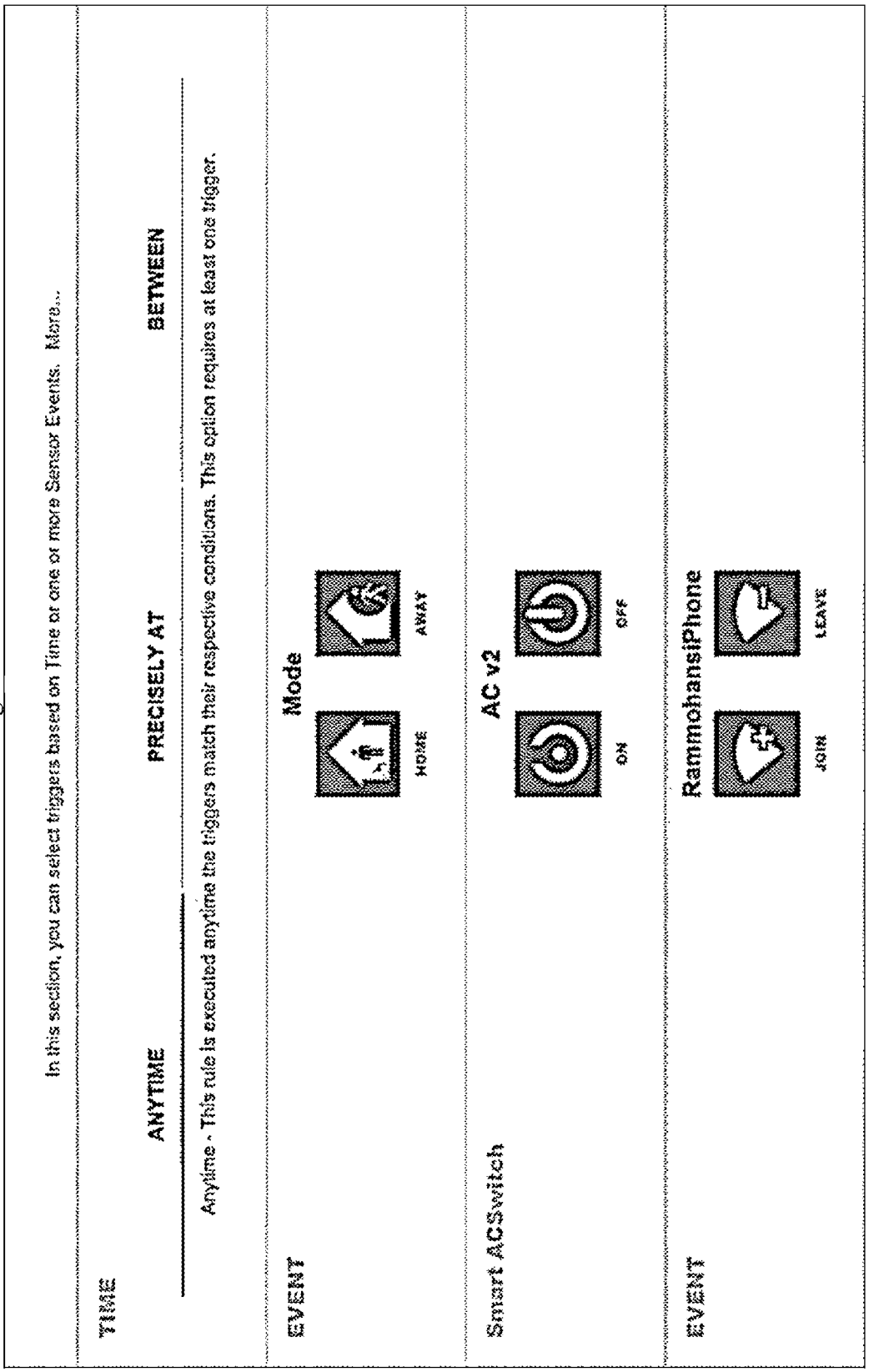
FIG. 10 shows how more parameters of the various user presence-based router controlled device algorithms (heuristics) can be entered

FIG. 10 shows more parameters. This figure shows that the heuristics (algorithms) and rules that can be set by the operator can be of the form: If during TIME, EVENT-X occurs, then with set DEVICE-Y to MODE-Z. Multiple If-then statements can be combined.

Figure 11:
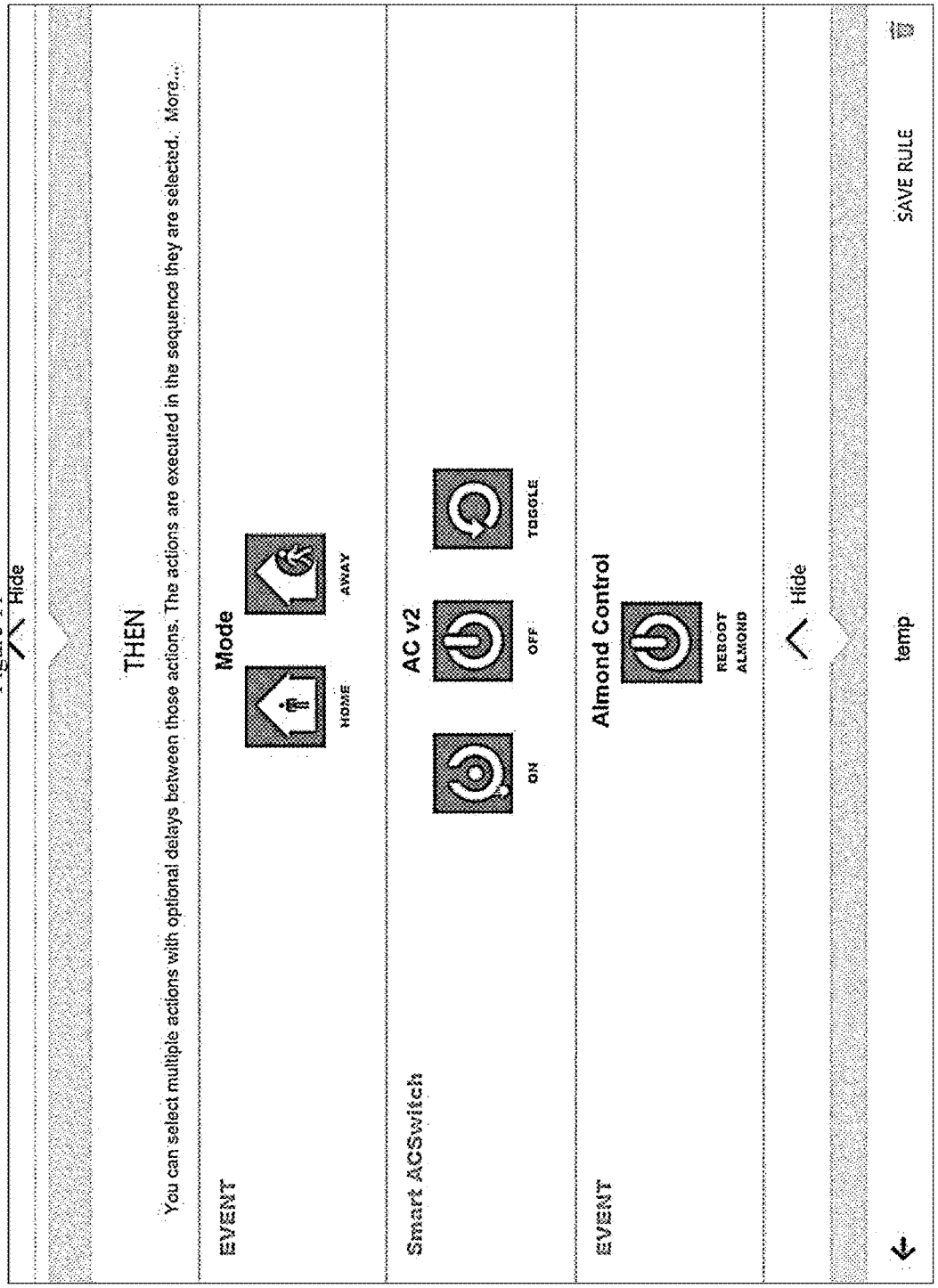
FIG. 11 shows more detail of the "THEN" part of one if—then heuristic.

FIG. 11 shows more detail of the "THEN" part of one if—then heuristic. Note that there can be multiple actions, with various operator preset delays between actions, and that the router operator can also determine the sequence by which these various multiple actions are performed.

Figure 12:
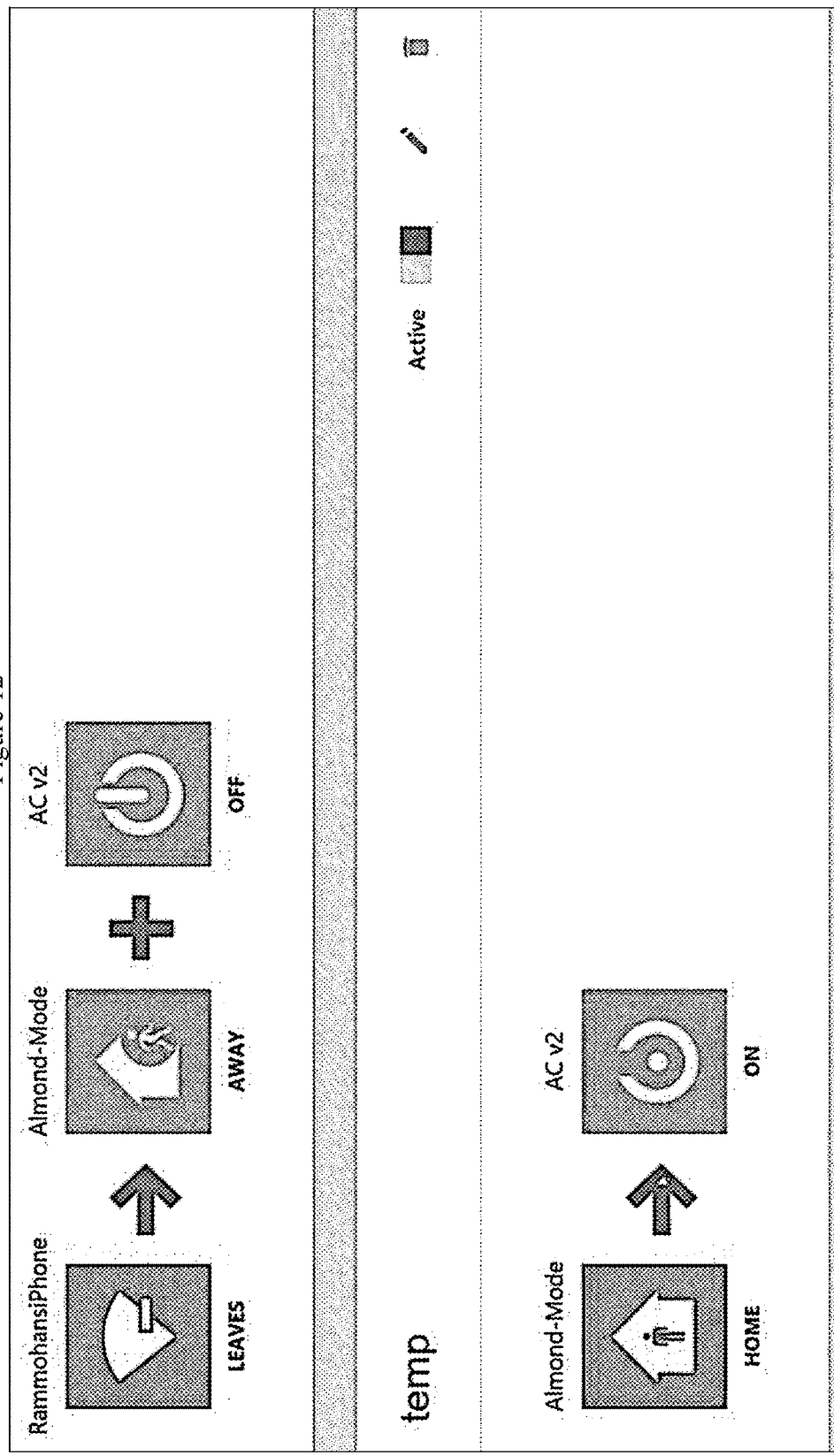
FIG. 12 shows an example of the Almond+ router configured with two different algorithms.

FIG. 12 shows an example of the Almond+ router set to two different algorithms. If the router detects that the user's iPhone is leaving, then the Almond+ router will set itself to "away" mode and send a ZigBee signal to turn off the air conditioner. The router is also set according to a "temp" algorithm so that when the Almond+ is in "home" mode, the air conditioner will be set to "on". In this example, assume that this "temp" algorithm isn't quite what the operator wants, and the operator will then adjust this in the following figures.

Figure 13:
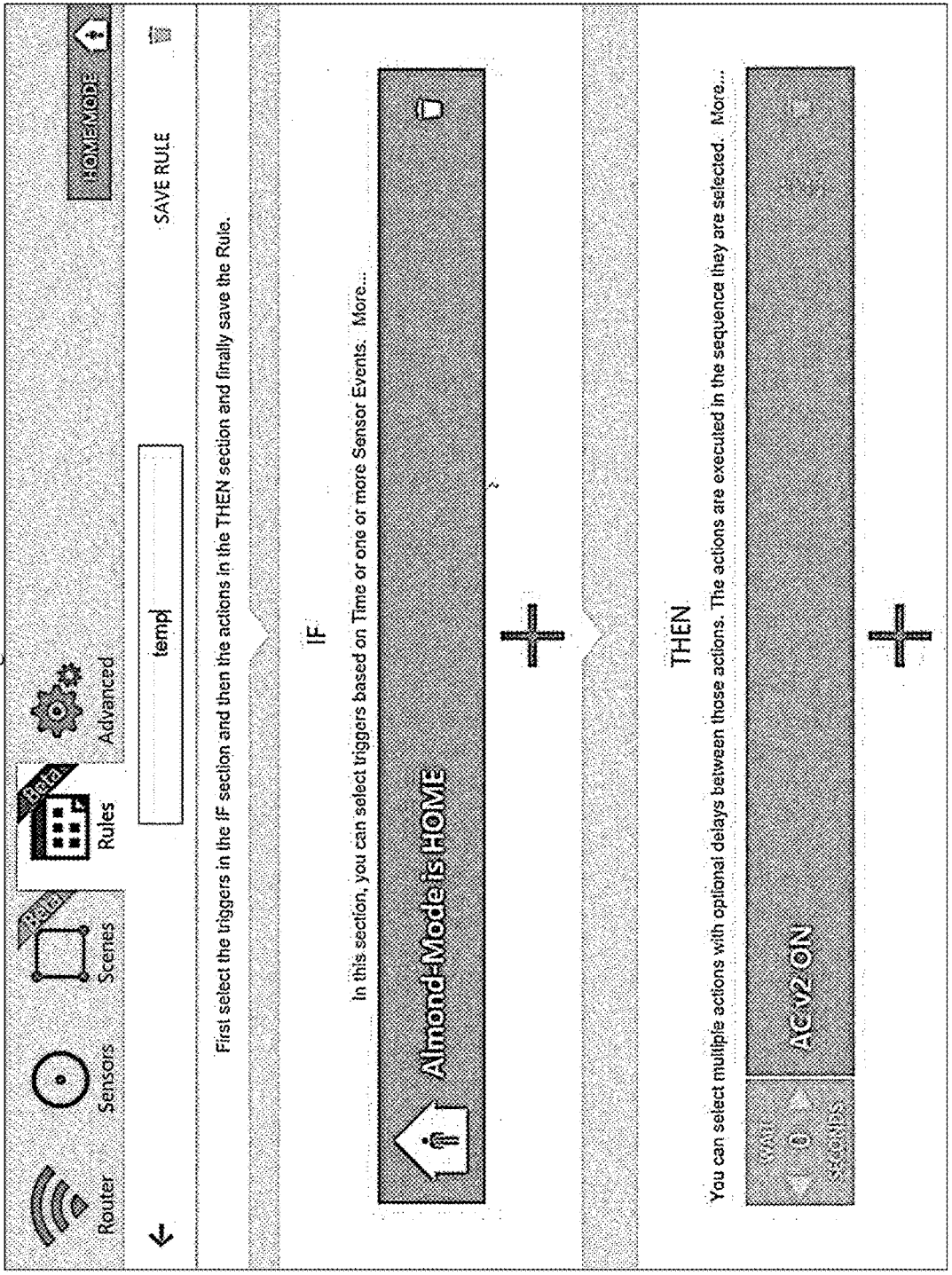
FIG. 13 shows that the operator is going to modify the "if" portion of the event to add an additional constraint to the "temp" algorithm.

FIG. 13 shows that the operator is going to modify the "if" portion of the event to add an additional constraint to the "temp" algorithm.

Figure 14:
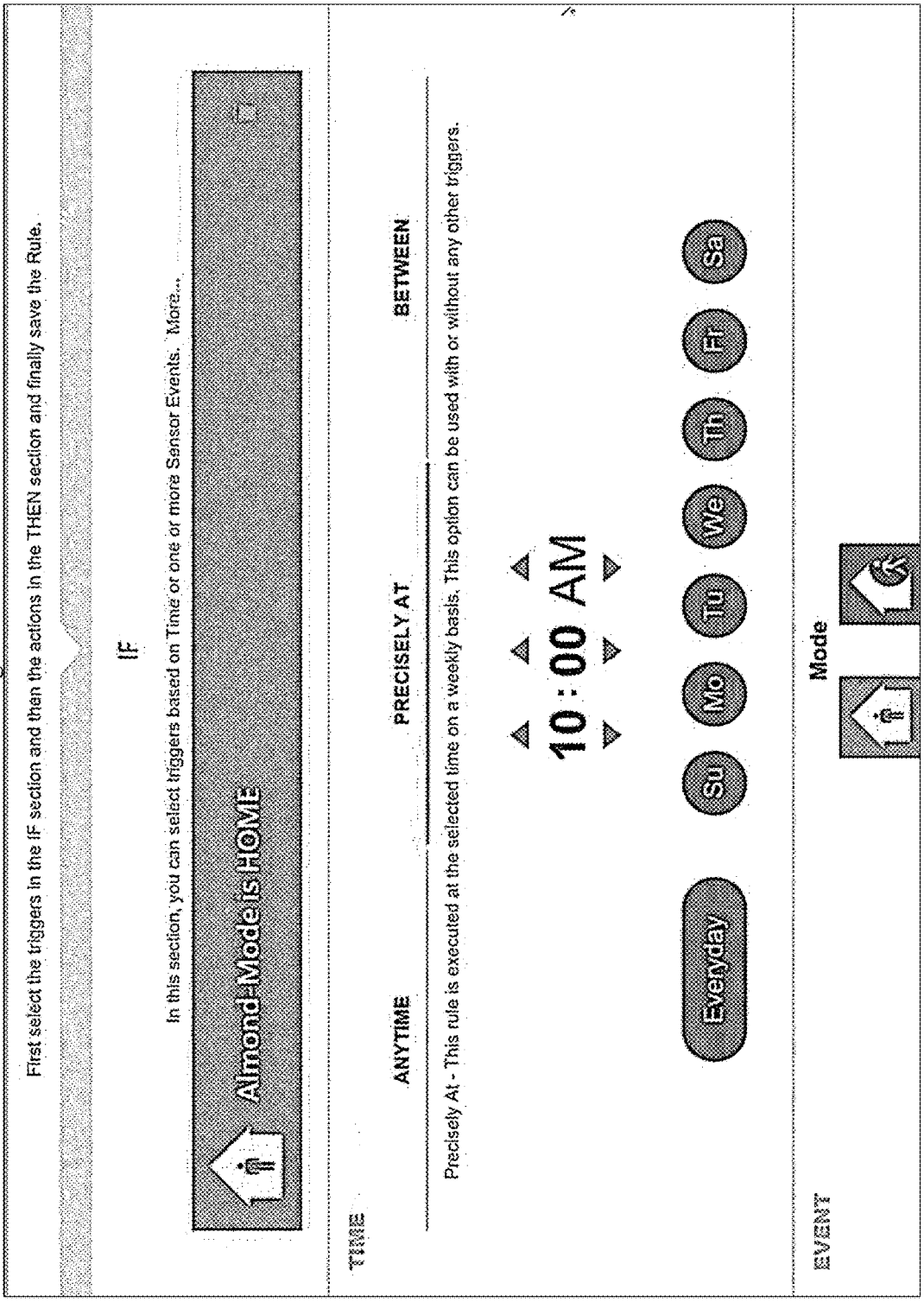
FIG. 14 shows that the operator is adding an additional constraint to the "if" portion of the event, which is that the "if" only applies during a certain time and date window.

FIG. 14 shows that the operator is adding an additional constraint to the "if" portion of the event, which is that the "if" only applies during a certain time and date window. This is essentially a "if condition 1 AND if condition 2" type constraint, where condition 1 is determined by the presence or absence of a user's iPhone as detected by the router's WiFi transceiver and processor, and condition 2 is a time and date condition.

Figure 15:
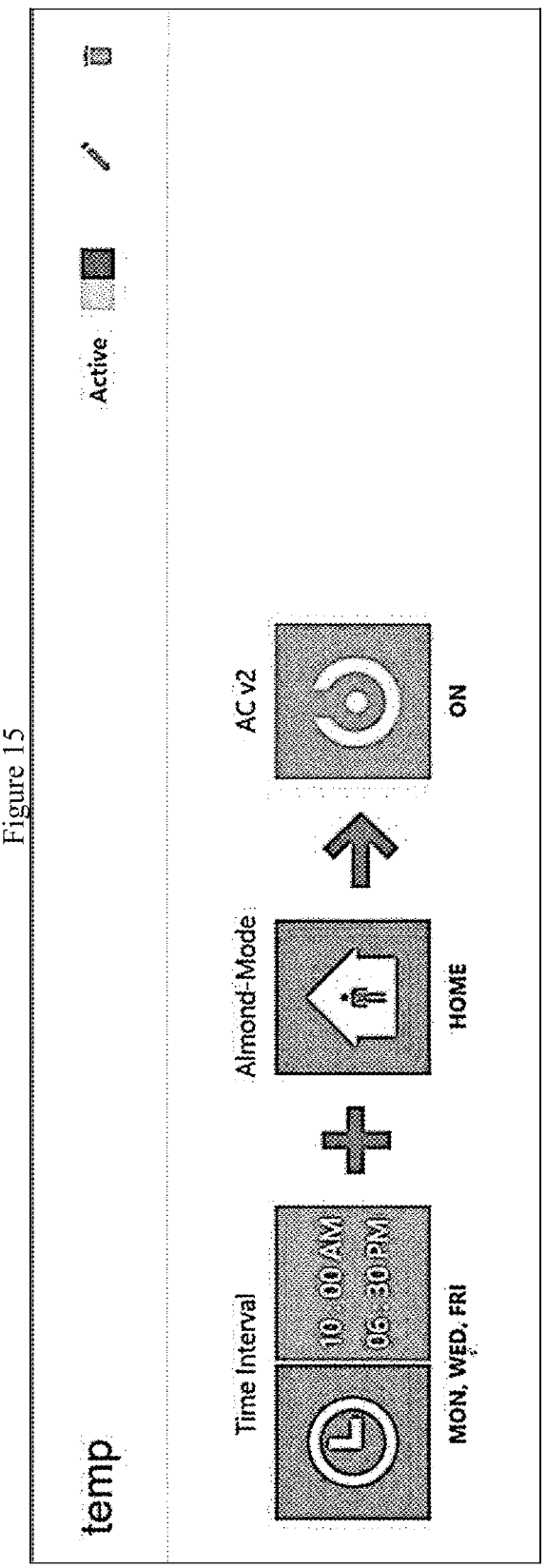
FIG. 15 shows the corrected "temp" algorithm.

FIG. 15 shows the corrected "temp" algorithm. Here if the time is between 10:00 AM and 6:30 PM on Mondays, Wednesdays, and Fridays, and if the almond is in "home" mode (because the user's iPhone has been detected, or due to other "home" mode setting criteria), then the Almond+ router will turn on the air conditioner.

FIG. 16 shows a summary of two different algorithms operating in the Almond+ router. "The Leaving Home" algorithm shows that if the WiFi signal from the previously detected user iPhone cannot be detected, then the Almond plus will set itself into "away" mode, and send a ZigBee signal to turn off the air conditioner. If the Almond+ router is in "home mode" (the algorithm for setting home mode is not shown, but here assume that a third algorithm specifies that home mode is set when at least the WiFi signal from the user's iPhone is detected), and if the time is between 10:00 AM and 6:30 PM on Mondays, Wednesdays, or Fridays, then the Almond plus router will send a ZigBee signal to turn on the air conditioner.

Other types of algorithms may also be used. As another example, rules can include combinations of various delay time and wait time intervals (e.g. "after" and "wait" intervals) such as:

If (A and B and after 10 minutes C) then (D and wait for 2 minutes E and wait for 3 minutes F)

Alternative Embodiments

In some alternative embodiments, the invention may be a wireless router with integrated sensors and activators
- The sensors can be connected to the router by a wired interface (Ethernet, USB) or these devices can be built into the routers
- If the sensors are built into the router, they connect to the router's one or more processors using a wired interface G, P10, I2C, USB, SPI, UART, etc.).
- Typical sensors include
    - Motion detectors, temperature detectors, humidity detectors, moisture detectors, light sensors, camera modules, microphones, shock detectors, tilt detectors, smoke detectors, vibration sensors, door and window opening sensors (e.g. magnetic reed sensors), flood (fluid level) sensors, Interface to automatically link action between some of these sensors and router controlled devices (certain sensors trigger certain action on router controlled devices)

These automatic actions are based on certain times of the days or week

Users can be notified of these sensor events through their mobile devices

Users can control these router controlled devices remotely and at home through their mobile devices.

Typical router controlled devices include

Thermostats, smart AC plugs, in-wall power receptacles, lights (e.g. dimmers, on/off, varying hue, floodlights, garden lights, mood lights and the like), door and window locks, sirens, and speakers, Machine Learning Methods:

In some alternative embodiments, at least some of the previously discussed processor and router controlled device operational heuristics can be automatically determined by using machine learning based algorithms. Here, for example, these machine learning algorithms can be configured to detect patterns of operation of the various router controlled devices and/or the various WiFi signals characteristic of various user associated devices. Such machine learning algorithms can include various types of supervised, unsupervised, semi-supervised learning, reinforcement learning, and data pre-preprocessing methods. Here, methods discussed by Flach in "*Machine Learning: The Art and Science of Algorithms that Make Sense of Data*" (2012), Cambridge University Press, as well as other methods (e.g. Google TensorFlow), may be useful.

Alternative Router Designs

In some embodiments, it may be useful to incorporate various additional control related devices into the circuitry of the router itself. These other devices can include built in router switched AC power receptacles, connectors or switches, as well as infrared transmitters (for infrared controlled devices such as televisions), speakers (for sound activated devices), and the like.

Interfaces with External Smart Devices:

In some embodiments, the system may also be configured to interact with external smart devices. These devices can include external voice recognition and control systems, as exemplified by the popular Amazon Echo series of smart voice recognition units. This type of smart device is configured to recognize the user's voice commands, and to use these voice commands to access information from the internet and/or to control various other electronic devices by sending and receiving commands and other information over a local WiFi router. Here, the invention, acting as the local WiFi router, also form a part of the control loop. Thus an "Alexa, I'm home" voice signal sent from a user to an Amazon Echo device can in turn be transmitted by the Echo to the invention, where this voice information in turn can be used as part of the various "if then" rules discussed elsewhere in this disclosure.

In other embodiments, the external smart device may be a control hub, or an intelligent internet controlled thermostat exemplified by the popular "Nest" thermostat series. Such internet controlled thermostats also typically connect to the internet via a WiFi router, and thus here as well, the invention can be used again form a part of the control loop. Here, for example, the invention can be used to determine if either a husband or a wife is at home by detecting the WiFi presence of their respective smart phones, and the invention can in turn interact with the Nest temperature control program to, depending on who is present, and the time of day (e.g. say when the user's normally arrive home from work) set the temperature for the preference of the husband, the preference of the wife, or a compromise preference when the WiFi presence of both smartphones are detected. The Nest device can in turn continue to otherwise intelligently control the temperature of the household based on its own independent assessment of user preferences at other times (e.g. when the Nest's device's independent best temperature assessments are not being guided by the WiFi presence of various user associated devices).

Regulating Router Connected Devices According to More Complex User Selected Plans:

In some embodiments, the invention may be configured to regulate various router connected devices to achieve even more complex goals than discussed above. These more complex goals can, for example, balance use of one router connected device versus the use of another router connected device in order to achieve various user behavioral objectives. A user who realizes that he is spending too much time on various social media websites, but not enough time exercising, may set up a program by which the router monitors time, or amount of data, or number of visits to one or more social media URL on a per day, week, or month basis (e.g. per time period basis) and compares this with an objective. For example, no more than 10 minutes on Facebook per day. The user can also assign a penalty number of points if this objective is exceeded.

Put in alternative language, in the above example, the user, here for example using a WiFi router connected computer (any sort) can set up the router to monitor the "device activity characteristic" WiFi signals for connecting to this particular social media URL. By setting up the objective amount of use for this URL, and the penalty number of points, the user is setting up a "device activity criteria" for this particular device and function.

Now, assume that the user has other objectives, such as exercising more, or reducing energy costs, or other objective. The user might then configure the router to also monitor user activity (e.g. via a user carried device such as a smartphone, or via user worn fitness devices such as a Fitbit device or an iWatch device, and the like. In some cases, this can be done by, for example, configuring the router to automatically access and parse the appropriate API for such devices.) For these user activity monitoring devices, the user may additionally set up an objective (say 20 minutes exercise per day), with a credit if the user exceeds this amount (and possibly a penalty depending on how short of the objective the user falls). Here too, according to the terminology, the user would be using activity characteristic WiFi signals (frim the fitness devices) and would also be assigning device activity criteria (the goals and penalties/credits) for the fitness devices.

A user wishing to also control energy costs might do the same thing, using a WiFi controlled thermostat. Here the user might enter in an objective (perhaps energy use per day) with appropriate penalty/credit points, and thus also be using the WiFi thermostat activity characteristic WiFi signals and WiFi thermostat device activity criteria to monitor the WiFi thermostat.

The user can also sum up all of these various penalties/credits for these various activities to produce an overall combined activity level. If the user is generally balancing the various activities in a net favorable manner, then the router may do nothing. If the user is, in balance, falling short (e.g. too much time on Facebook, not enough time exercising), then the router may store this "problem" in memory, and from there use this registered problem to trigger other activities, which will be discussed shortly.

Put alternatively, in some embodiments, the invention may be an alternative system or method of using a WiFi router to regulate use of a plurality of router connected devices. Here, as before, the WiFi router will typically comprise at least one processor, at least one of local or cloud memory, and at least one WiFi transceiver.

According to this alternative method, the invention will use the WiFi router, and device identification criteria stored in this memory, to determine presence and probable identities of the plurality of devices in at least WiFi communication with the router by determining WiFi signals characteristic of these various devices. Here, at least some of these various devices will be producing activity characteristic WiFi signals that are detectable by said WiFi router. For example, for a device used for web browsing, the activity characteristic WiFi signals can include the URL of the websites being browsed. For a WiFi thermostat, the activity characteristic WiFi signals can include data pertaining to thermostat use, and so on.

The invention will use at least one set (and often multiple sets) of device activity criteria to monitor these various devices. These device activity criteria will typically entered by the user using various types of user interfaces as previously discussed. Here the main difference is that instead of explicitly controlling the device, the user will instead enter in use goals, as well as user selected penalty or credit points (e.g. positive or negative points) depending on if the goals are not met, or how far actual use deviated from the goals.

The invention (typically using the router's processor), will combine these various device activity criteria from the various devices to produce a combined activity value, and store these various device activity criteria and the combined activity value in said memory. The invention will then use the router's at least one processor, the device activity criteria, and the activity characteristic WiFi signals to see how closely the various activities are to the users goals. In other words, the router will use the activity characteristic WiFi signals to perform a comparison (over the various devices) between the combined activity value, and a target combined activity value, and store a record of this comparison in memory (either local router memory, or cloud memory, or both depending on the configuration).

FIG. 17 shows an example of how the invention can regulate one or more WiFi connected devices according to an overall optimization scheme, such as a scheme designed to achieve a user selected goal.

More specifically, FIG. 17 shows an example of how the invention can be configured to balance a user's time on a "limited" or "monitored" URL (for example, a website that the user may be wasting too much time on) versus the user's other activities, such as exercise or energy use.

Here the user configures the router (100) with various device activity criteria (DAC) for the user's WiFi (range of WiFi shown as 150) connected tablet computer (152), the user's WiFi connected wearable computer (used to track exercise), and the user's WiFi connected thermostat. In this example, the user has previously used the tablet computer to configure the router with the rules: DAC 1: monitor tablet (152) for no more than 10 minutes per day (over the internet connected network 200) on a limited URL (perhaps Facebook), DAC 2, monitor the wearable computer (154) to show at least 10 minutes per day running, DAC 3 monitor the thermostat (156) for no more than 10 minutes air conditioning use per day. The penalty for infractions in this simplified example (which shows up in the combined activity value) is one point per minute that the goal has not been met. The user has also allowed no more than 20 points of deviation from these various goals to show up in the target combined activity value.

Put alternatively, in this embodiment, the WiFi router (100) has a network connection with the Internet (200). Here the activity characteristic WiFi signals comprise at least one URL of at least one internet servers (here the "limited URL" 202) accessed by at least one of the plurality of devices (here device 152).

In this example, and as shown in FIG. 17, the device activity criteria (DAC152) for tablet (152) comprise an identity of the at least one URL (202), and wherein any of time spent on this at least one identified URL (202), amount of data downloaded from this at least one identified URL, or number of visits to this at least one identified URL during a given time interval (for example, over a day) are used to produce the combined activity value (Activity). In FIG. 17, as shown by the table, Tablet (152) has a criteria of less than 10 minutes use per day (LTD<10). However in actuality, the user was on this URL for 30 minutes (Activity LTD=30 m). Assume that the user decided self-impose a penalty of 1 point for time over 10 minutes. Than in this case, the router will assign a penalty of 20 points to the user (Subtotal 20).

Put alternatively, here at least one of said plurality of devices is a user associated device (152) associated with an identified user, and the WiFi (100) router is using presence of this user associated device and the identified user to select at least one set of device activity criteria. That is, in this example, the user has only imposed this limitation on URL (202) on himself. Other users may not be affected, and if so, the router will not use the above 10 minutes per day limitation on other users.

However assume also that the user has other goals, such as more exercise, and is willing to reward himself to exercise more by using more exercise to offset more time on the limited URL (202). For example, more exercise gets more time on Facebook.

So the user has set up other device activity criteria, such as DAC154, and the router is using the activity characteristic WiFi signals from a user worn device (154) to monitor exercise, with a goal more than 10 minutes running per day, and another penalty of one point for every minute short of this goal. In this example, however, the user only ran for 5 minutes that day (too much time on Facebook, perhaps), and so the user has racked up another 5 points of penalty.

The user may have had a third goal, which was to keep energy costs down by running the air conditioner less than 10 minutes per day. Here the user has set up the device activity criteria (DAC156) for the WiFi Thermostat (156) accordingly. In this example, the user achieved the goal; actual activity was 10 minutes, so no penalty points have accrued.

The user may have also decided to select a threshold of action (e.g. Target combined activity level) of 20. That is, minor infractions are tolerated, but when it gets too severe, the user wants the system to take action.

In this case, the router would perform the comparison, and automatically calculate that for this day, the user's actual combined activity value (25) was above the target combined activity level of (20). The router would store a record of the results of this comparison (at least a flag that the target was not met) in memory.

Depending on what router controlled device control heuristics were previously stored in memory, the router than may take action upon determining that the target was not achieved. For example, the router may cut off access to the limited URL (202) for a period of time, but continue access to unlimited URL (204). Alternatively the system may allow the temperature of the user's dwelling to rise, in order to save money, by sending appropriate commands to WiFi thermostat (156).

Use with external servers: In some embodiments, the user may have other objectives or wish to self-impose other penalties that may not be feasible to monitor or impose with a router. Such objectives could include amount of volunteer work, savings per month, and the like. Or the user may wish to self-impose non-router controlled device type penalties in order to achieve his objectives. Here, an external server (206) (in communication with the router 100) might be used to keep track of these other objectives or penalties, and the user in turn can set up goals and penalties/credits for these other objectives/penalties that might be used to balance times when the user was perhaps falling short (e.g. spending too much time on Facebook, and not exercising, with the air conditioning turned on).

In these remote server embodiments, the router (100) may optionally also inform remote server (206) that the target was not met. Depending on how remote server (206) is configured, remote server (206) may choose to offset the user's failure to control their web browsing activity on website (202), perhaps in credit for other good activities that the user has registered with remote server (206). Alternatively or additionally, remote server (206) may transmit a warning to the user, such as to user device (152), or impose other type of user selected penalties on the user. In FIG. 17, the user has set the server to email a warning to the user if the difference between the combined activity value and the target combined activity value is greater than zero. The user has set the router to at least temporarily turn off access to the limited URL (202) if the difference is greater than zero.

Thus in this embodiment, the router's processor can be used to transmit a record of this comparison (e.g. a flag that there is a difference greater than zero) to a remote server. This remote server, and at least one set of server-based device activity monitoring and control criteria, can then be used to offset at least one device activity characteristic of at least one device for purposes of modifying the combined activity value. So again as an example, if the server knows that the user did something else desirable, and server has been configured appropriately, then the server can offset perhaps too much time on Facebook, or not enough exercise.

In some embodiments, this remote server can be a social network server. Here the idea is to increase the user's incentive to adhere to the user's self-imposed requirements by transmitting records of the user's adherence, or lack thereof, of these requirements to various social networking sites. In alternative embodiments, the router may also be configured to transmit the user's success or failure at meeting various device activity criteria for individual devices, as well as the user's overall success or failure of meeting the user's target combined activity level over a plurality of such device activity criteria to this remote server as well.

This remote server may also be configured with at least one set of server device activity monitoring and control criteria, to offset at least one device activity characteristic of at least one device for said combined activity value. These server device activity monitoring and control criteria can also be entered in by the user, typically by using the server's processor to generate an interface to a computerized device used by the operator. This server side device activity monitoring and control criteria operator interface can provide an ability to configure the server device activity monitoring and control criteria by entering various if—then type rules, and wherein these operator entered if—then rules often stored in the remote server's memory. Thus in general, the remote server may be configured using user interfaces previously described above.

Figure 18A:
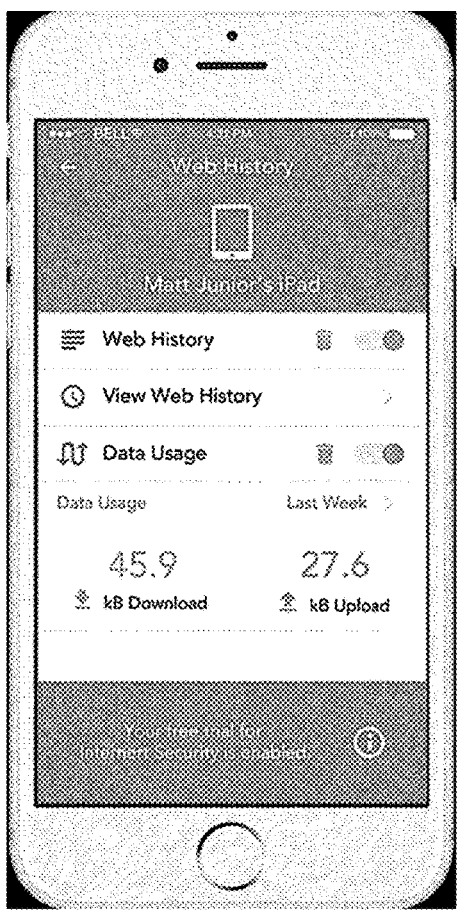
FIG. 18A shows how the invention can monitor a user's overall web browsing history.

FIG. 18A shows an example of the router (100) monitoring an identified user's overall web browsing history and data use, perhaps from tablet (152).

Figure 18B:
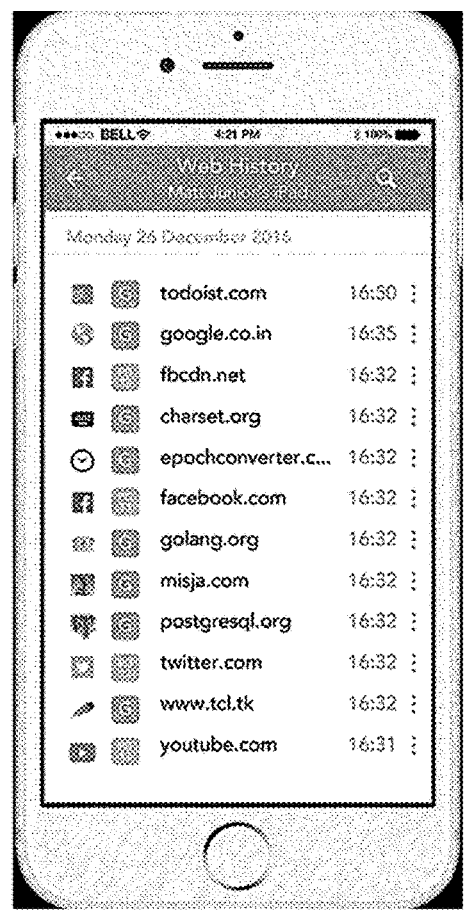
FIG. 18B shows how the invention can monitor which specific websites a user visits, and in some embodiments control the use of other WiFi connected devices so as to encourage or discourage certain patterns of website use.

FIG. 18B shows how the invention can monitor which specific websites an identified user (here Matt Junior) visits, and in some embodiments control the use of other WiFi connected devices so as to encourage or discourage certain patterns of website use. Here assume that many of the websites are "unlimited URL" (204), but at least one (or more) websites, perhaps facebook.com are "limited" URL (202).

The identity of either the user or the device may be determined by various methods. For example, in the case where at least one of the various devices has a persistent MAC (Media Access Control) address, the router may be configured to stores this persistent MAC address in memory, and use this persistent MAC address to determine the probable identify of the at least one device, and optionally the user as well.

So putting the above discussion in alternative language, in some embodiments, the user associated device associated with an identified user (e.g. Tablet 152, associated with Matt Junior) may be configured to monitor the user's physical exercise. Here the at least one set of device activity criteria (DAC154) associated with this device monitors physical exercise.

In this example, although a tablet (152) was used, the user associated device associated with an identified user can be many other types of computerized devices, such as any of a personal computer, laptop computer, tablet computer, wearable computer, smartphone, or smart television.

Note also that in these examples, at least some of the plurality of devices (here both the Tablet 152, the exercise monitoring device 154, and the WiFi controlled thermostat 156) each produce a plurality of different activity characteristic WiFi signals that are detectable by the WiFi router (100), and the invention is further using a combination of these different activity characteristic WiFi signals to produce at least a portion (here the entire portion) of the combined activity value.

In these examples, note also that the device activity characteristics for the plurality of devices (here 152, 154, 156) comprises a plurality of device activity criteria, and these plurality of device activity criteria are combined to produce a single combined activity value.

In this discussion, note also that we are using a "credit" from one activity that the user approves of to "offset" a penalty from another activity that the user does not approve of.

Other schemes are possible. In this example, the various results from various devices (which may include multiple functions from any given device), are then combined to produce one (a single) combined activity value. Note that in this scheme, however, the device activity characteristic for a first device may be used to offset the device activity characteristic of a second device (e.g. more exercise reported by device 154 can offset more time on Facebook reported by device 152). Alternatively, however, a first device activity characteristic for a first device can also be used offset a second device activity characteristic of this first device. For example, consider tablet (152) again. The user could also configure, just for device (152) various device activity characteristics (DAC) so that more time spent on an educational URL could be used to offset more time spent on a social media URL.

Configuring the system: As previously described, in this embodiment of the invention, to enter in these various parameters, the router (100) will typically use its processor to provide an operator interface wherein a human operator may configure parameters such the device activity criteria, said combined activity value, and said target combined activity level. These operator interfaces can be similar to those previously shown in FIGS. 7-16, for example.

In particular, these operator interfaces, as previously discussed, can be provided by using the WiFi router and its processor to generating an interface to a router connected computerized device (e.g. 152) used by the operator. As previously discussed, this operator interface can further provide an ability to configure the device activity criteria by entering various if—then type rules. These operator entered if—then rules can then be stored in memory (e.g. often onboard router memory, but optionally also cloud memory such as memory in server (206).

The operator interface can further provide an ability to configure said device activity criteria by entering in various times and date type rules, as well as assigning penalty and credit points, and these also will typically be stored in memory.

Note that to control any of the various router controlled device (e.g. perhaps to turn off air conditioning using device 156 if the user browses Facebook too much on device 152), the system will typically use the router's at least one processor and router controlled device control heuristics stored in memory, as well as the probable identity of said router controlled device, and the record of the comparison (e.g. the difference value in FIG. 17) to control an operation of the router controlled device.

As before, these router controlled device can be any of router controlled thermostats, smart AC plugs, in-wall power receptacles, lights, door locks, window locks, sirens, and speakers, and the like. In thus, the user could also program the speakers to play annoying music if the user browses on Facebook too much, for example.

Although often the WiFi router will be used to control other devices via WiFi signals, in some embodiments, as previously discussed, the WiFi router further can comprise a unitized case with a built in WiFi router controlled AC switch receptacle, or other AC switch configured to control availability of AC power to an external device based on WiFi router control commands.

Thus in summary, according to this alternative embodiment, the user can configure the router to reward and penalize various activities, according to various user entered device activity criteria. Penalties might be imposed for spending too much time on a particular website (such as Facebook) on a per day, week, or month basis. The system might also penalize too much total time spent web browsing, or too many visits to a particular website, total number of website visits across all websites, or even never visiting a particular website. The system might reward activities such as visiting fitness websites, more exercise, lower energy use, better sleeping habits, and the like.

The invention claimed is:

1. A method of using a WiFi router to regulate use of a plurality of router connected devices, said WiFi router comprising at least one processor, at least one of local or cloud memory, and at least one WiFi transceiver, said method comprising:

using said WiFi router, and device identification criteria stored in said memory, to determine presence and probable identities of said plurality of devices by determining WiFi signals characteristic of said plurality of devices;

at least some of said plurality of devices producing activity characteristic WiFi signals that are detectable by said WiFi router;

wherein said WiFi router has a network connection with the Internet, and in which said activity characteristic WiFi signals comprises at least one URL of at least one internet servers accessed by at least one of said plurality of devices;

using at least one set of device activity criteria to monitor said plurality of devices;

combining said device activity criteria to produce a combined activity value, and storing said device activity criteria and said combined activity value in said memory;

using said at least one processor, said device activity criteria, and said activity characteristic WiFi signals to perform, for said plurality of devices, a comparison between said activity characteristic WiFi signals, said combined activity value, and a target combined activity value, and store a record of said comparison in said memory.

2. The method of claim 1, wherein said device activity criteria comprise an identity of said at least one URL, and wherein any of time spent on at least one identified URL, amount of data downloaded from said at least one identified URL, or number of visits to said at least one identified URL during a given time interval are used to produce said combined activity value.

3. The method of claim 1, wherein at least one of said plurality of devices is a user associated device associated with an identified user, and wherein said WiFi router uses a presence of said user associated device and said identified user to select said at least one set of device activity criteria.

4. The method of claim 3, wherein said user associated device associated with an identified user is configured to monitor physical exercise of said user, and wherein said at least one set of device activity criteria associated with this device monitors said physical exercise.

5. The method of claim 3, wherein said user associated device associated with an identified user comprises any of a personal computer, laptop computer, tablet computer, wearable computer, smartphone, or smart television.

6. The method of claim 1, wherein at least some of said plurality of devices each produce a plurality of different activity characteristic WiFi signals that are detectable by said WiFi router, further using a combination of said different activity characteristic WiFi signals for at least a portion of said combined activity value.

7. The method of claim 1, wherein said device activity characteristics for said plurality of devices comprises a plurality of device activity criteria, and wherein combining said plurality of device activity criteria produces a single combined activity value.

8. The method of claim 7, wherein, for said single combined activity value, using at least one of:

a) a device activity characteristic for a first device to offset the device activity characteristic of a second device; and a) a first device activity characteristic for a first device to offset a second device activity characteristic of said first device.

9. The method of claim 1, further using said processor and said WiFi router to provide an operator interface wherein a human operator may configure any of said device activity criteria, said combined activity value, and said target combined activity value.

10. The method of claim 9, wherein said processor and said WiFi router provide said operator interface by generating an interface to a router connected computerized device used by said operator; said operator interface further providing an ability to configure said device activity criteria by entering various if—then type rules, and wherein said operator entered if—then rules are stored in said memory.

11. The method of claim 10, wherein said operator interface further provides an ability to configure said device activity criteria by entering in any of times and date type rules, and wherein said times and date type rules are stored in said memory.

12. The method of claim 1 wherein at least one of said plurality of devices further comprises a router controlled device;
using said at least one processor and router controlled device control heuristics stored in said memory, said probable identity of said router controlled device, and said record of said comparison to control an operation of said router controlled device.

13. The method of claim 12, wherein said router controlled device is any of router controlled thermostats, smart AC plugs, in-wall power receptacles, lights, door locks, window locks, sirens, and speakers.

14. The method of claim 12, wherein said at least one WiFi router further comprises a unitized case with a built in WiFi router controlled AC switch receptacle or other AC switch configured to control availability of AC power to an external device based on WiFi router control commands.

15. The method of claim 1, wherein at least one of said plurality of devices has a persistent MAC address; and
said WiFi router stores said persistent MAC address in memory, and uses said persistent MAC address to determine said probable identify of said at least one device.

16. The method of claim 1, further using said processor to transmit said record of said comparison to a remote server.

17. The method of claim 16, further using said remote server, and at least one set of server device activity monitoring and control criteria, to offset at least one device activity characteristic of at least one device for said combined activity value.

18. A method of using a WiFi router to regulate use of a plurality of router connected devices, said WiFi router comprising at least one processor, at least one of local or cloud memory, and at least one WiFi transceiver, said method comprising:
using said WiFi router, and device identification criteria stored in said memory, to determine presence and probable identities of said plurality of devices by determining WiFi signals characteristic of said plurality of devices;
at least some of said plurality of devices producing activity characteristic WiFi signals that are detectable by said WiFi router;
using at least one set of device activity criteria to monitor said plurality of devices;
wherein at least one of said plurality of devices is a user associated device associated with an identified user, and wherein said WiFi router uses a presence of said user associated device and said identified user to select said at least one set of device activity criteria;
combining said device activity criteria to produce a combined activity value, and storing said device activity criteria and said combined activity value in said memory;
using said at least one processor, said device activity criteria, and said activity characteristic WiFi signals to perform, for said plurality of devices, a comparison between said activity characteristic WiFi signals, said combined activity value, and a target combined activity value, and store a record of said comparison in said memory.

19. A method of using a WiFi router to regulate use of a plurality of router connected devices, said WiFi router comprising at least one processor, at least one of local or cloud memory, and at least one WiFi transceiver, said method comprising:
using said WiFi router, and device identification criteria stored in said memory, to determine presence and probable identities of said plurality of devices by determining WiFi signals characteristic of said plurality of devices;
at least some of said plurality of devices producing activity characteristic WiFi signals that are detectable by said WiFi router;
using at least one set of device activity criteria to monitor said plurality of devices;
combining said device activity criteria to produce a combined activity value, and storing said device activity criteria and said combined activity value in said memory;
wherein at least some of said plurality of devices each produce a plurality of different activity characteristic WiFi signals that are detectable by said WiFi router, further using a combination of said different activity characteristic WiFi signals for at least a portion of said combined activity value;
using said at least one processor, said device activity criteria, and said activity characteristic WiFi signals to perform, for said plurality of devices, a comparison between said activity characteristic WiFi signals, said combined activity value, and a target combined activity value, and store a record of said comparison in said memory.

20. A method of using a WiFi router to regulate use of a plurality of router connected devices, said WiFi router comprising at least one processor, at least one of local or cloud memory, and at least one WiFi transceiver, said method comprising:
using said WiFi router, and device identification criteria stored in said memory, to determine presence and probable identities of said plurality of devices by determining WiFi signals characteristic of said plurality of devices;
at least some of said plurality of devices producing activity characteristic WiFi signals that are detectable by said WiFi router;
using at least one set of device activity criteria to monitor said plurality of devices;
combining said device activity criteria to produce a combined activity value, and storing said device activity criteria and said combined activity value in said memory;
wherein said device activity characteristics for said plurality of devices comprises a plurality of device activity criteria, and wherein combining said plurality of device activity criteria produces a single combined activity value;

using said at least one processor, said device activity criteria, and said activity characteristic WiFi signals to perform, for said plurality of devices, a comparison between said activity characteristic WiFi signals, said combined activity value, and a target combined activity value, and store a record of said comparison in said memory.

21. A method of using a WiFi router to regulate use of a plurality of router connected devices, said WiFi router comprising at least one processor, at least one of local or cloud memory, and at least one WiFi transceiver, said method comprising:

using said WiFi router, and device identification criteria stored in said memory, to determine presence and probable identities of said plurality of devices by determining WiFi signals characteristic of said plurality of devices;

at least some of said plurality of devices producing activity characteristic WiFi signals that are detectable by said WiFi router;

using at least one set of device activity criteria to monitor said plurality of devices;

combining said device activity criteria to produce a combined activity value, and storing said device activity criteria and said combined activity value in said memory;

using said at least one processor, said device activity criteria, and said activity characteristic WiFi signals to perform, for said plurality of devices, a comparison between said activity characteristic WiFi signals, said combined activity value, and a target combined activity value, and store a record of said comparison in said memory;

further using said processor and said WiFi router to provide an operator interface wherein a human operator may configure any of said device activity criteria, said combined activity value, and said target combined activity value.

22. A method of using a WiFi router to regulate use of a plurality of router connected devices, said WiFi router comprising at least one processor, at least one of local or cloud memory, and at least one WiFi transceiver, said method comprising:

using said WiFi router, and device identification criteria stored in said memory, to determine presence and probable identities of said plurality of devices by determining WiFi signals characteristic of said plurality of devices;

at least some of said plurality of devices producing activity characteristic WiFi signals that are detectable by said WiFi router;

using at least one set of device activity criteria to monitor said plurality of devices;

combining said device activity criteria to produce a combined activity value, and storing said device activity criteria and said combined activity value in said memory;

using said at least one processor, said device activity criteria, and said activity characteristic WiFi signals to perform, for said plurality of devices, a comparison between said activity characteristic WiFi signals, said combined activity value, and a target combined activity value, and store a record of said comparison in said memory;

wherein at least one of said plurality of devices further comprises a router controlled device;

using said at least one processor and router controlled device control heuristics stored in said memory, said probable identity of said router controlled device, and said record of said comparison to control an operation of said router controlled device.

23. A method of using a WiFi router to regulate use of a plurality of router connected devices, said WiFi router comprising at least one processor, at least one of local or cloud memory, and at least one WiFi transceiver, said method comprising:

using said WiFi router, and device identification criteria stored in said memory, to determine presence and probable identities of said plurality of devices by determining WiFi signals characteristic of said plurality of devices;

wherein at least one of said plurality of devices has a persistent MAC address; and said WiFi router stores said persistent MAC address in memory, and uses said persistent MAC address to determine said probable identify of said at least one device;

at least some of said plurality of devices producing activity characteristic WiFi signals that are detectable by said WiFi router;

using at least one set of device activity criteria to monitor said plurality of devices;

combining said device activity criteria to produce a combined activity value, and storing said device activity criteria and said combined activity value in said memory;

using said at least one processor, said device activity criteria, and said activity characteristic WiFi signals to perform, for said plurality of devices, a comparison between said activity characteristic WiFi signals, said combined activity value, and a target combined activity value, and store a record of said comparison in said memory.

24. A method of using a WiFi router to regulate use of a plurality of router connected devices, said WiFi router comprising at least one processor, at least one of local or cloud memory, and at least one WiFi transceiver, said method comprising:

using said WiFi router, and device identification criteria stored in said memory, to determine presence and probable identities of said plurality of devices by determining WiFi signals characteristic of said plurality of devices;

at least some of said plurality of devices producing activity characteristic WiFi signals that are detectable by said WiFi router;

using at least one set of device activity criteria to monitor said plurality of devices;

combining said device activity criteria to produce a combined activity value, and storing said device activity criteria and said combined activity value in said memory;

using said at least one processor, said device activity criteria, and said activity characteristic WiFi signals to perform, for said plurality of devices, a comparison between said activity characteristic WiFi signals, said combined activity value, and a target combined activity value, and store a record of said comparison in said memory;

further using said processor to transmit said record of said comparison to a remote server; and further using said remote server, and at least one set of server device activity monitoring and control criteria, to offset at least one device activity characteristic of at least one device for said combined activity value.

* * * * *